United States Patent
Kishikawa et al.

(10) Patent No.: US 10,320,826 B2
(45) Date of Patent: Jun. 11, 2019

(54) ANOMALY DETECTION ELECTRONIC CONTROL UNIT, ONBOARD NETWORK SYSTEM, AND ANOMALY DETECTION METHOD

(71) Applicant: Panasonic Intellectual Property Corporation of America, Torrance, CA (US)

(72) Inventors: Takeshi Kishikawa, Osaka (JP); Yoshihiro Ujiie, Osaka (JP); Tomoyuki Haga, Nara (JP); Hideki Matsushima, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 151 days.

(21) Appl. No.: 15/228,299

(22) Filed: Aug. 4, 2016

(65) Prior Publication Data

US 2016/0359893 A1 Dec. 8, 2016

Related U.S. Application Data

(63) Continuation of application No. PCT/JP2015/005668, filed on Nov. 13, 2015.
(Continued)

(30) Foreign Application Priority Data

Oct. 2, 2015 (JP) .................. 2015-196430

(51) Int. Cl.
*H04L 12/40* (2006.01)
*H04L 29/06* (2006.01)
*H04L 29/08* (2006.01)

(52) U.S. Cl.
CPC .... *H04L 63/1425* (2013.01); *H04L 12/40013* (2013.01); *H04L 67/12* (2013.01);
(Continued)

(58) Field of Classification Search
CPC ................................................. H04L 63/1425
See application file for complete search history.

(56) References Cited

U.S. PATENT DOCUMENTS

2014/0310530 A1* 10/2014 Oguma ................. H04L 9/3242
713/181
2015/0066239 A1* 3/2015 Mabuchi ............. H04L 63/1408
701/1

FOREIGN PATENT DOCUMENTS

| JP | 2013-098719 A | 5/2013 |
| JP | 2013-131907 | 7/2013 |
| WO | 2013/093591 A1 | 6/2013 |

OTHER PUBLICATIONS

International Search Report of PCT application No. PCT/JP2015/005668 dated Dec. 22, 2015.
(Continued)

*Primary Examiner* — Kambiz Zand
*Assistant Examiner* — Thanh H Le
(74) *Attorney, Agent, or Firm* — Greenblum & Bernstein, P.L.C.

(57) ABSTRACT

An anomaly detection electronic control unit, that performs anomaly detection processing and that is connected to a bus which a plurality of electronic control units use for communication to communicate following a Controller Area Network (CAN) protocol, includes an anomaly detection processing requester that decides an anomaly detection processing timing based on an ID of a data frame acquired from the bus, and an anomaly detection processor that performs anomaly detection processing regarding the data
(Continued)

frame at the anomaly detection processing timing decided by the anomaly detection processing requester.

13 Claims, 14 Drawing Sheets

Related U.S. Application Data

(60) Provisional application No. 62/085,744, filed on Dec. 1, 2014.

(52) U.S. Cl.
CPC ............. *H04L 2012/40215* (2013.01); *H04L 2012/40273* (2013.01)

(56) References Cited

OTHER PUBLICATIONS

Masato Hata et al., "Implementation and Evaluation of a Method for Preventing Unauthorized Data Transmission", IEICE (The Institute of Electronics, Information and Communication Engineerings) Technical Report ISEC20-74, Dec. 5, 2012, vol. 112, No. 342, pp. 15-22.
Extended European Search Report, dated May 18, 2018, from the European Patent Office (EPO) for the related European Patent Application No. 18156427.9.

\* cited by examiner

FIG. 3
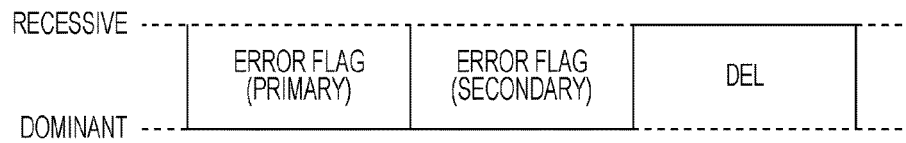
FIG. 4
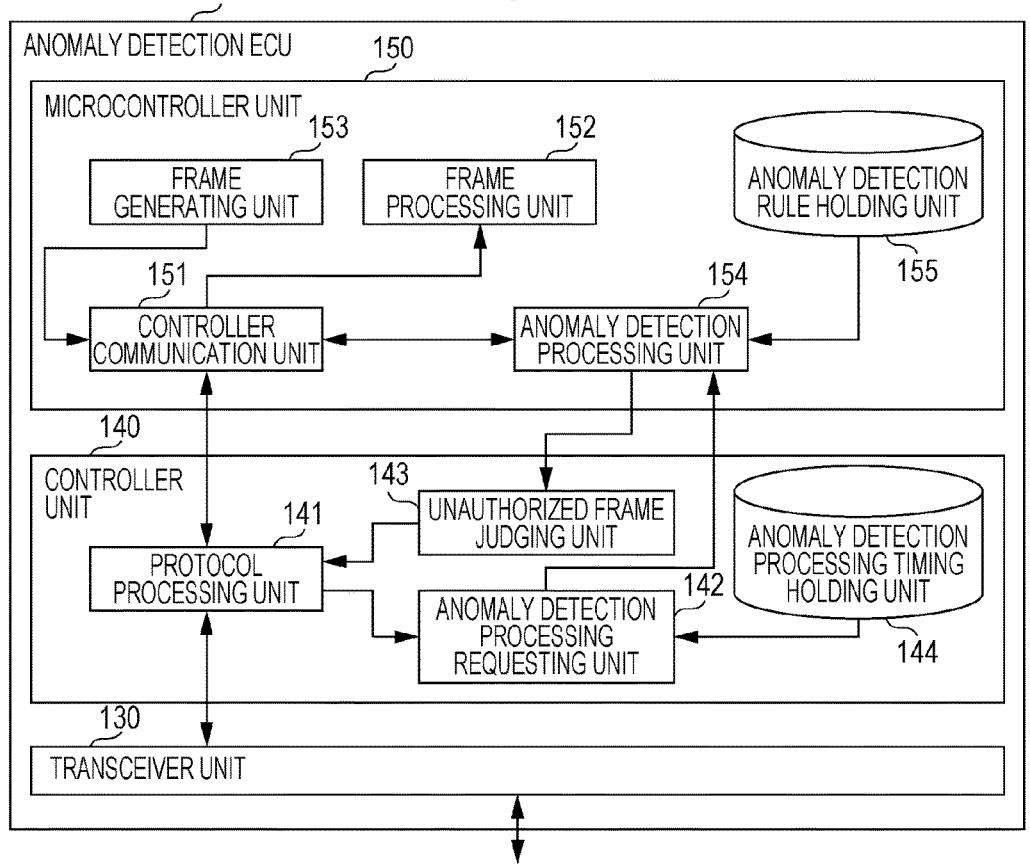
FIG. 5
| ID | ANOMALY DETECTION PROCESSING TIMING |
|---|---|
| 0×100 | WHEN RECEIVING ID |
| 0×200 | WHEN RECEIVING ID, WHEN RECEIVING DATA |
| 0×300 | NONE |
| 0×400 | WHEN RECEIVING ID WHEN RECEIVING DLC |

| ID | DLC | DATA | CYCLE (ms) |
|---|---|---|---|
| 0×100 | NONE | NONE | 20 |
| 0×200 | NONE | HIGHEST ORDER BYTE IS 0×20 | NONE |
| 0×300 | 4 | NONE | NONE |
| 0×400 | 2 | NONE | NONE |

FIG. 12

| MONITORING LEVEL | ANOMALY DETECTION PROCESSING TIMING |
|---|---|
| 0 | NONE |
| 1 | WHEN DATA FRAME RECEPTION COMPLETED |
| 2 | WHEN RECEIVING ID |
| 3 | WHEN RECEIVING ID, DLC, AND DATA |

| STATE OF VEHICLE \ NUMBER OF TIMES ANOMALY DETECTED | 4 TIMES OR LESS | 5 TIMES OR MORE |
|---|---|---|
| WHEN STOPPED | 0 | 0 |
| WHEN CHARGING | 1 | 3 |
| WHEN DRIVING | 2 | 3 |
| WHEN DRIVING AT HIGH SPEED | 3 | 3 |

| STATE OF VEHICLE \ NUMBER OF TIMES ANOMALY DETECTED | 4 TIMES OR LESS | 5 TIMES OR MORE |
|---|---|---|
| WHEN STOPPED | 1 | 2 |
| WHEN CHARGING | 2 | 3 |
| WHEN DRIVING | 0 | 0 |
| WHEN DRIVING AT HIGH SPEED | 0 | 0 |

| STATE OF VEHICLE \ NUMBER OF TIMES ANOMALY DETECTED | 4 TIMES OR LESS | 5 TIMES OR MORE |
|---|---|---|
| WHEN STOPPED | 1 | 1 |
| WHEN CHARGING | 3 | 3 |
| WHEN DRIVING | 2 | 2 |
| WHEN DRIVING AT HIGH SPEED | 2 | 2 |

| STATE OF VEHICLE \ NUMBER OF TIMES ANOMALY DETECTED | 4 TIMES OR LESS | 5 TIMES OR MORE |
|---|---|---|
| WHEN STOPPED | 0 | 0 |
| WHEN CHARGING | 0 | 0 |
| WHEN DRIVING | 1 | 3 |
| WHEN DRIVING AT HIGH SPEED | 1 | 3 |

| ID | NUMBER OF TIMES ANOMALY DETECTED | TIME LAST UPDATED |
|---|---|---|
| 0×100 | 0 | WHEN STARTING |
| 0×200 | 0 | WHEN STARTING |
| 0×300 | 0 | WHEN STARTING |
| 0×400 | 3 | 20 MINUTES AFTER STARTING |
FIG. 15
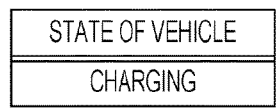
| STATE OF VEHICLE |
|---|
| CHARGING |
FIG. 16
| ID | MONITORING LEVEL |
|---|---|
| 0×100 | 1 |
| 0×200 | 2 |
| 0×300 | 3 |
| 0×400 | 0 |
FIG. 17
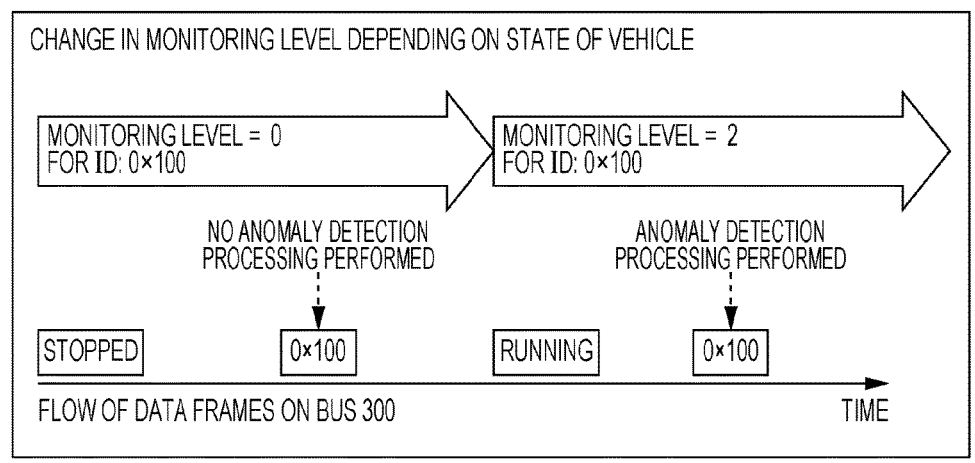

ANOMALY DETECTION ELECTRONIC CONTROL UNIT, ONBOARD NETWORK SYSTEM, AND ANOMALY DETECTION METHOD

BACKGROUND

1. Technical Field

The present invention relates to technology for detecting unauthorized frames transmitted over an onboard network by which an electronic control unit performs communication.

2. Description of the Related Art

In recent years, a great number of electronic control units (ECU) have been placed in systems in automobiles. A network connecting these ECUs is referred to as an onboard network. Many standards exist for onboard networks. The most mainstream of these is a standard called Controller Area Network (CAN), that is stipulated in ISO11898-1.

A CAN is configured using two busses, and each ECU connected to the buses is called a node. Each node connected to a bus transmits/receives messages called frames. A transmitting node that transmits a frame applies voltage to the two busses, and generates potential difference between the busses, thereby transmitting a value "1" called recessive, and a value "0" called dominant. In a case where multiple transmitting nodes transmit recessive and dominant at exactly the same timing, the dominant is transmitted with priority. In a case where there is an abnormality in the format a received frame, a receiving node transmits a frame called an error frame. An error frame is a continuous transmission of six bits, thereby notifying the transmitting node and other receiving nodes that there is an abnormality.

No identifiers indicating the transmission destination or transmission source exist in CAN, with the transmitting node attaching an identifier (ID) to each frame and transmitting (i.e., sending out signals to the bus), and the receiving nodes only receiving frames of a predetermined ID (i.e., reading signals from the bus). The Carrier Sense Multiple Access/Collision Avoidance (CSMA/CA) format is employed, so when multiple nodes transmit at the same time, arbitration by message ID is performed, with frames having a smaller message ID value being transmitted with higher priority.

There is a threat to onboard CAN network systems in that an attacker might unauthorizedly control an ECU by accessing the bus and transmitting unauthorized frames, and security measures are being studied.

For example, the onboard network monitoring system described in Japanese Unexamined Patent Application Publication No. 2013-131907 monitors frames flowing over the CAN bus, and transmits warning information in a case where an unauthorized frame is detected. An ECU which has received the warning information is forbidden from control according to the unauthorized frame.

SUMMARY

In one general aspect, the techniques disclosed here feature an anomaly detection electronic control unit that performs anomaly detection processing and that is connected to a bus which a plurality of electronic control units use for communication to communicate following a CAN protocol. The anomaly detection electronic control unit includes an anomaly detection processing requester that decides an anomaly detection processing timing based on an ID of a data frame acquired from the bus, and an anomaly detection processor that performs anomaly detection processing regarding the data frame at the anomaly detection processing timing decided by the anomaly detection processing requester.

According to the present disclosure, instead of performing uniform monitoring of each data frame transmitted over the bus to ensure security, anomaly detection processing is performed at timings in accordance with IDs of frames, so efficient detection of unauthorized frames can be realized.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a diagram illustrating a format of an error frame stipulated in the CAN protocol;

FIG. 4 is a configuration diagram of an anomaly detection ECU according to the first embodiment;

FIG. 5 is a diagram illustrating an example of correlated information stored in an anomaly detection processing timing holding unit of the anomaly detection ECU according to the first embodiment;

FIG. 12 is a diagram illustrating an example of information for identifying timing for anomaly detection processing, which the anomaly detection ECU according to the second embodiment uses;

FIGS. 13A through 13D are diagrams illustrating an example of tables used to decide a monitoring level by the anomaly detection ECU according to the second embodiment;

FIG. 14 is a diagram illustrating an example of anomaly state information held in an anomaly state holding unit of the anomaly detection ECU according to the second embodiment;

FIG. 15 is a diagram illustrating an example of vehicle state information held in a vehicle state holding unit of the anomaly detection ECU according to the second embodiment;

FIG. 16 is a diagram illustrating an example of monitoring level information held in a monitoring level holding unit of the anomaly detection ECU according to the second embodiment;

FIG. 17 is a diagram illustrating an example of change in operations of the anomaly detection ECU according to the second embodiment (change in accordance with change in state of vehicle);

DETAILED DESCRIPTION

Figure 1:
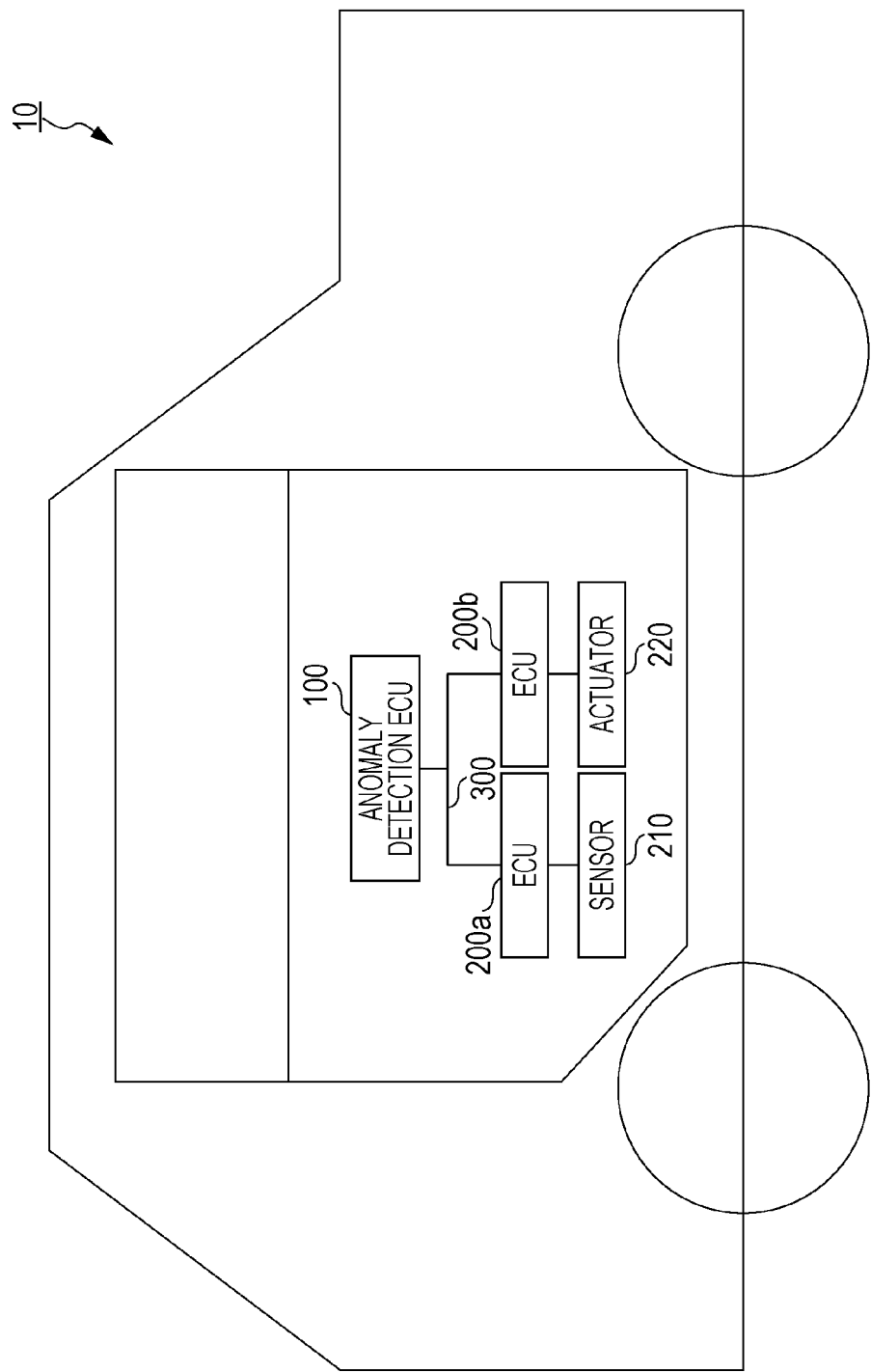
FIG. 1 is a diagram illustrating the overall configuration of an onboard network system according to a first embodiment.

Underlying Knowledge Forming Basis of the Present Invention

Now, a situation where excessive monitoring for the threat of unauthorized frames leads to excessive electric power consumption of the onboard network system including the monitoring device is undesirable.

Accordingly, in order to prevent increased electric power consumption while ensuring security of the onboard network system, the present disclosure provides an anomaly detection electronic control unit (anomaly detection ECU), which is an ECU that is capable of efficiently executing anomaly detection processing to detect transmission of unauthorized frames. The present disclosure also provides an onboard network system having the ECU that efficiently performs anomaly detection processing, and an anomaly detection method used by in the onboard network system to efficiently detect unauthorized frames.

An anomaly detection electronic control unit according to one aspect of the present disclosure is an anomaly detection electronic control unit that performs anomaly detection processing and that is connected to a bus which a plurality of electronic control units use for communication to communicate following a CAN protocol. The anomaly detection electronic control unit includes: an anomaly detection processing requester that decides an anomaly detection processing timing based on an ID of a data frame acquired from the bus; and an anomaly detection processor that performs anomaly detection processing regarding the data frame at the anomaly detection processing timing decided by the anomaly detection processing requester. Accordingly, anomaly detection processing is performed at a timing based on the ID of the data frame, so efficient detection of unauthorized frames can be realized.

The anomaly detection electronic control unit may further include: a microcontroller that is a semiconductor integrated circuit including a microprocessor that executes a program; and a controller that is a semiconductor integrated circuit that is connected to the microcontroller and that realizes functions of the anomaly detection processing requester. The microprocessor realizes the functions of the anomaly detection processor by performing the anomaly detection processing in correlation with an interruption request signal by executing the program, and the anomaly detection processing requester sends out the interruption request signal to the microprocessor at the decided anomaly detection processing timing. Accordingly, an interruption request signal is notified to the processor of the microcontroller when the anomaly detection processing timing arrives, so no anomaly detection processing is performed by the processor until the interruption request signal is input, and may be in a low-power-consumption state (sleep state) or the like. Accordingly, ensuring security can be realized while relatively suppressing electric power consumption.

The anomaly detection electronic control unit may further include an anomaly detection processing timing holder that holds correlation information, in which a timing is correlated with each of one or more IDs. The anomaly detection processing requester makes the decision, with a timing correlated with the ID of the data frame acquired from the bus in the correlation information as the anomaly detection processing timing. Accordingly, IDs of data frames which are important from the perspective of security and IDs of data frames which are have less importance can be set to different anomaly detection processing timings in correlation information, so that unauthorized frames can be efficiently detected in accordance with importance.

The correlation information may have the reception timing of one or a plurality of particular fields in a data frame correlated with the timing, for each of the one of more IDs, and the anomaly detection electronic control unit may send an error frame to the bus in a case that the anomaly detection processor detects an anomaly in the anomaly detection processing performed at a receipt timing of the particular field. One of the one or plurality of particular fields may be one of an ID field, a data length code (DLC) field, and a data field. According to these, with regard to IDs of data frames which are important from the perspective of security, anomaly detection processing is performed at the reception timing of a particular field (e.g., ID field, DLC field, data field, etc.), and control or the like of the ECU corresponding to the unauthorized frame can be prevented by sending out an error frame upon an anomaly being detected.

The anomaly detection electronic control unit may further include an anomaly state holder that holds anomaly state information, which is updated so as to indicate, regarding each of the plurality of IDs according to the correlation information, a number of times of detection of anomalies in the anomaly detection processing already performed regarding data frames having that ID. With regard to each of the plurality of IDs, the greater the number of times of detection of anomalies regarding that ID is in the anomaly state information, the more reception timings of the particular fields the anomaly detection processing timing holder correlates that ID with in the correlation information. Accordingly, the monitory frequency is raised in a case where the number of anomalies detected increases, so handling of anomalies can be performed more speedily, for example.

The anomaly detection processing requester may perform the deciding of the anomaly detection processing timing in accordance with the detection results of anomalies in the anomaly detection processing that has already been performed. Accordingly, the number of times of detection of anomalies can be reflected in the anomaly detection processing timing, so effective monitoring (i.e., execution of anomaly detection processing) such as raising the monitoring frequency only in a case where a certain level or more of anomalies has occurred, for example, can be performed.

The anomaly detection processing requester may perform the deciding of the anomaly detection processing timing in accordance with a state of a vehicle in which the bus is installed. Accordingly, efficient detection of unauthorized frames is realized in a case where the importance of security of a data frame including a particular ID changes in relation with the state of the vehicle.

An arrangement may be made where, if the ID of the data frame is a first value, the anomaly detection processing requester performs the deciding such that the anomaly detection processing timing is a timing when receiving the data frame, and if the ID of the data frame is a second value that is different from the first value, performs the deciding such that the anomaly detection processing timing is a timing after completion of receiving the data frame, and in a case of having detected an anomaly in the anomaly detection processing performed by the anomaly detection processor at the timing of receiving the data frame, the anomaly detection electronic control unit sends out an error frame onto the bus. Accordingly, in a case where the necessity of anomaly detection differs for each data frame ID, such as whether to speedily detect and prevent an anomaly, or whether to perform comprehends inspection regarding the anomaly, anomaly detection processing can be realized in accordance with the necessity. For example, if anomaly detection processing is performed with the timing of while receiving the data frame as the anomaly detection processing timing, an unauthorized data frame can be overwritten and invalidated by sending out an error frame at the time of detecting an anomaly. Also, if anomaly detection processing is performed with the timing of completion of receiving the data frame as the anomaly detection processing timing, the content of each part of the ID field, DLC, data field, and so forth within the data frame can be inspected at this one timing, so efficient anomaly detection can be realized.

The anomaly detection electronic control unit may further include memory that stores the program. Also, the anomaly detection electronic control unit may further include a hard disk device that stores the program.

An onboard network system according to one aspect of the present disclosure is an onboard network system including a plurality of electronic control units that communicate via a bus following a CAN protocol. The onboard network system includes: an anomaly detection processing requester that decides an anomaly detection processing timing based on an ID of a data frame acquired from the bus; and an anomaly detection processor that performs anomaly detection processing regarding the data frame at the anomaly detection processing timing decided by the anomaly detection processing requester. This enables realization of an onboard network system where power consumption is efficiently suppressed by performing anomaly detection at a timing based on the ID of the data frame.

An anomaly detection method according to one aspect of the present disclosure is an anomaly detection method used in an onboard network system including a plurality of electronic control units that communicate via a bus following a CAN protocol. The method includes: deciding an anomaly detection processing timing based on an ID of a data frame acquired from the bus; and performing anomaly detection processing regarding the data frame at the decided anomaly detection processing timing. Accordingly, anomaly detection processing can be efficiently performed at a timing based on the ID of the data frame.

These general or specific aspects may be realized by a system, method, integrated circuit, computer program, or computer-readable recording medium such as a CD-ROM, and may be realized by any combination of a system, method, integrated circuit, computer program, and recording medium.

The following is a detailed description of an onboard network system according to embodiments with reference to the drawings. Note that the embodiments described below are all specific examples of the present disclosure. Accordingly, values, components, placements and connected states of components, steps (processes) and the order of steps, and so forth illustrated in the following embodiments, are only exemplary, and do not restrict the present disclosure. Components in the following embodiments which are not included in an independent Claim are optional components. The drawings are all schematic diagrams and are not necessarily created in an exact manner.

First Embodiment

An anomaly detection method used in an onboard network system 10 where multiple ECUs communicate via a bus will be described as an embodiment of the present disclosure, with reference to the diagrams. The anomaly detection method is primarily executed by an anomaly detection ECU connected to the bus. The anomaly detection ECU has a function to decide a timing at which a processor (microprocessor) is to execute a control program for the anomaly detection processing (processing to distinguish whether a frame that has appeared on the bus is an unauthorized frame or not), in accordance with a data frame being received, and thus realizes efficient anomaly detection.

1.1 Overall Configuration of Onboard Network System 10

FIG. 1 is a diagram illustrating the overall configuration of the onboard network system 10 according to the first embodiment. The onboard network system 10 is an example of a network communication system that communicates according to the CAN protocol, and is a network communication system onboard an automobile in which various types of devices have been installed, such as a control device, sensor, actuator, and so forth. The onboard network system 10 has multiple devices that perform communication relating to frames via the bus, using the anomaly detection method. Specifically, the onboard network system 10 includes a bus 300, an anomaly detection ECU 100, and nodes which are ECUs such as ECUs 200a and 200b connected to various types of devices and to the bus, as illustrated in FIG. 1. Note that many other ECUs besides the anomaly detection ECU 100 and ECUs 200a and 200b are included in the onboard network system 10, but description will be made focusing on the anomaly detection ECU 100 and ECUs 200a and 200b, for sake of convenience. An ECU (e.g., the anomaly detection ECU 100, ECUs 200a and 200b, etc.) is a device that includes, for example, digital circuits such as a processor (microprocessor), memory, and so forth, analog circuits, communication circuits, and so forth. The memory is read-only memory (ROM), random access memory (RAM), and so forth, capable of storing a control program (computer program) to be executed by the processor.

Alternatively, an ECU may include a hard disk device excluded from illustration, for example. Further, a control program (computer program) may be stored in the hard disk device. Part or all of the functions of the components of the ECU can be realized by software, by the processor operating following the control program (computer program), for example. A computer program is configured as a combination of multiple command codes representing instructions to the processor, to achieve predetermined functions.

The ECUs 200a and 200b are connected to the bus 300, and respectively connected to a sensor 210 and an actuator 220. Examples of the sensor 210 include an acceleration sensor, steering angle sensor, and so forth. Examples of the actuator 220 include a brake actuator, and so forth. The ECU 200a acquires the state of the sensor 210 and includes the acquired information in a data frame, and sends the data frame out onto the bus 300. The ECU 200b receives the data frame sent out onto the bus 300 by the ECU 200a, and controls the actuator 220 according to the information relating to the state of the sensor 210 included in that data frame.

The anomaly detection ECU 100 is a type of ECU connected to the bus 300, and has a function of monitoring frames flowing over the bus (i.e., frames appearing on the bus), and performs anomaly detection processing to distinguish whether or not unauthorized frames (i.e., frames that do not meet rules decided beforehand) are flowing over the bus 300.

The ECUs on the onboard network system 10 exchange frames following the CAN protocol. Frames in the CAN protocol include data frames, remote frames, overload frames, and error frames. Description will be made primarily here regarding data frames and error frames.

1.2 Data Frame Format

Figure 2:
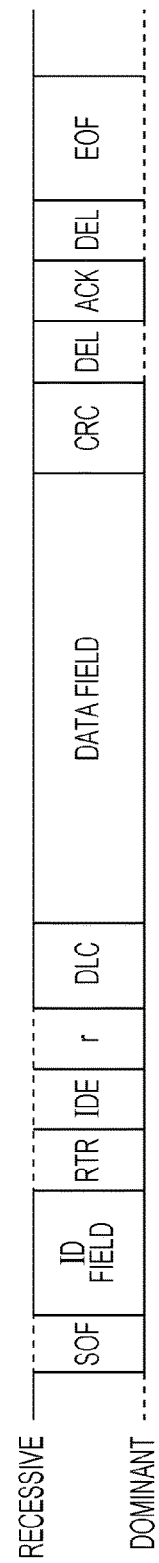
FIG. 2 is a diagram illustrating a format of a data frame stipulated in the CAN protocol.

The following is a description of a data frame which is a type of frame used on a network according to the CAN protocol. FIG. 2 is a diagram illustrating a format of a data frame stipulated by the CAN protocol. FIG. 2 illustrates a data frame according to a standard ID format stipulated in the CAN protocol. A data frame is configured including the fields of a start of frame (SOF), ID field, remote transmission request (RTR), identifier extension (IDE), reserved bit "r", data length code (DLC), data field, cyclic redundancy check (CRC) sequence, CRC delimiter "DEL", acknowledgement (ACK) slot, ACK delimiter "DEL", and end of frame (EOF).

The SOF is made up of 1-bit dominant. The state of the bus is recessive when idle, and start of transmission of a frame is notified by being changed to dominant by the SOF.

The ID field is made up of 11 bits, and is a field storing an ID which is a value indicating the type of data. Design has been implemented so that in a case where multiple nodes start transmission at the same time, frames with smaller ID values are given higher priority, in order to perform communication arbitration using this ID field.

The RTR is a value identifying a data frame and remote frame, and is made up of 1-bit dominant in a data frame.

The IDE and "r" are each made up of 1-bit dominant.

The DLC is made up of four bits, and is a value indicating the length of the data field. The four bits that store the value of the DLC in the data frame are also called the DLC field.

The data field is a maximum of 64 bits, and is a value indicating the content of the data being transmitted. The length can be adjusted in 8-bit increments. The CAN protocol does not stipulate the specification of data being transmitted; that is set at the onboard network system 10. Accordingly, the specification is dependent on the model, manufacturer (manufacturing maker), or the like.

The CRC sequence ("CRC" illustrated in FIG. 2) is made up of 15 bits. This is calculated from the transmitted values of the SOF, ID field, control field, and data field.

The CRC delimiter (the "DEL" between the "CRC" and "ACK" in FIG. 2) is made up of 1-bit recessive, and is a sectioning symbol representing the end of the CRC sequence. The CRC sequence and CRC delimiter are collectively referred to as the CRC field.

The ACK slot (the "ACK" in FIG. 2) is made up of one bit. The transmitting node performs transmission with the ACK slot set to recessive. The receiving node transmits the ACK slot as dominant if up to the CRC sequence has been received normally. Dominant has higher priority than recessive, so if the ACK slot is dominance after transmission, so the transmitting node will be able to confirm that one of the receiving nodes has succeeded in reception of the ACK slot is dominant after transmission.

The ACK delimiter (the "DEL" between the "ACK" and "EOF" in FIG. 2) is made up of 1-bit recessive, and is a sectioning symbol representing the end of the ACK.

The EOF is made up of 7-bits recessive, and represents the end of the data frame.

1.3 Error Frame Format

FIG. 3 is a diagram illustrating the format of the error frame stipulated in the CAN protocol. An error frame is made up of an error flag (primary), error flag (secondary), and an error delimiter.

The error flag (primary) is used to notify occurrence of an error to other nodes. A node which has detected an error transmits six consecutive bits dominant to notify other nodes of the occurrence of the error. This transmission violates the bit stuffing rule in the CAN protocol (that six bits or more of the same value are not to be consecutively transmitted), and causes other nodes to transmit an error frame (secondary).

The error flag (secondary) is made up of six consecutive bits dominant, used to notify occurrence of an error to the other nodes. All nodes that have received the error flag (primary) and detected the violation of the bit stuffing rule will transmit the error flag (secondary).

The error delimiter "DEL" is an 8-bit consecutive recessive, and indicates the end of the error frame.

1.4 Configuration of Anomaly Detection ECU 100

FIG. 4 is a configuration diagram of the anomaly detection ECU 100. The anomaly detection ECU 100 is configured including a transceiver unit 130, a controller unit 140, and a microcontroller unit 150.

The transceiver unit 130 is an electronic circuit such as a communication circuit or the like. The transceiver unit 130 converts frames notified from the controller unit 140 into electric signals that can be transmitted onto the bus 300, and transmits. The transceiver unit 130 also receives electric signals appearing on the bus 300, and thereby notifies the controller unit 140 of the content of the frame received one bit at a time.

The controller unit 140 is a semiconductor integrated circuit that includes a digital circuit and memory and so forth, and that exchanges signals with the microcontroller unit 150 and transceiver unit 130. The controller unit 140 includes a protocol processing unit 141, an anomaly detection processing requesting unit 142, an unauthorized frame judging unit 143, and an anomaly detection processing timing holding unit 144.

The protocol processing unit 141 performs communication with the transceiver unit 130, and carries out processing following a protocol (CAN protocol or the like). In a case of having detected an error in a frame being received, for example, the protocol processing unit 141 notifies the transceiver unit 130 of transmission of an error frame (i.e., a transmission request), to cause the transceiver unit 130 to transmit an error frame. In a case of having completed transmission of the data frame, the protocol processing unit 141 notifies the microcontroller unit 150 of completion of reception of the data frame. In response to a data frame transmission request from the microcontroller unit 150, the protocol processing unit 141 notifies the transceiver unit 130 so as to be able to transmit the data frame in accordance with the protocol. The protocol processing unit 141 also notifies the anomaly detection processing requesting unit 142 of the content notified from the transceiver unit 130. In a case of being notified by the unauthorized frame judging unit 143 of transmission of an error frame (i.e., a transmission frame), the protocol processing unit 141 notifies the transceiver unit 130 of the transmission of the error frame. The protocol processing unit 141 also temporarily holds the content of the data frame that has appeared on the bus 300, acquired via the transceiver unit 130, and if requested by the microcontroller unit 150 for information such as the ID, DLC, data, and so forth, that are necessary for anomaly detection processing, hands the requested information to the microcontroller unit 150. The protocol processing unit 141 further calculates the difference between the previous time of reception of a data frame and the time of reception this time, and if requested for timing notification information relating to the reception timing, that is the calculation results thereof and so forth, hand that timing notification information to the microcontroller unit 150.

The anomaly detection processing requesting unit 142 is notified of a data frame being received by the protocol processing unit 141, references the anomaly detection processing timing holding unit 144 during reception of the data frame, and decides the anomaly detection notification timing in accordance with the data frame being received (specifically, the ID of the frame). The anomaly detection processing requesting unit 142 then notifies an anomaly detection processing unit 154 of the microcontroller unit 150 of an anomaly detection processing request signal, at the point that the decided anomaly detection processing timing has arrived.

The unauthorized frame judging unit 143 acquires the detection results regarding an anomaly in the anomaly detection processing by the anomaly detection processing unit 154 of the microcontroller unit 150, and In a case of having detected an anomaly, notifies the protocol processing unit 141 of transmission of an error frame.

The anomaly detection processing timing holding unit 144 holds correlation information correlating multiple IDs with respective timings (see FIG. 5), in a storage medium (also called recording medium) or the like. A storage medium is, for example, memory included in the anomaly detection ECU 100 (e.g., controller unit 140).

The microcontroller unit 150 is a semiconductor integrated circuit including a processor (microprocessor) that exchanges signals with the controller unit 140 and executes a program, and memory. The program is stored in the memory of the semiconductor integrated circuit, for example. Alternatively, in a case where the anomaly detection ECU 100 includes a hard disk device omitted from illustration, the program may be recorded in the hard disk device. The microcontroller unit 150 functions by executing this program. The microcontroller unit 150 includes, as functional components realized by the processor that executes the program, the memory, and so forth, a controller communication unit 151, a frame processing unit 152, a frame generating unit 153, the anomaly detection processing unit 154, and an anomaly detection rule holding unit 155.

The controller communication unit 151 notifies the frame processing unit 152 of the data frame received from the controller unit 140. The controller communication unit 151 notifies the controller unit 140 of a data frame notified from the frame generating unit 153, and performs a data frame transmission request. The controller communication unit 151 receives an acquisition request notification for information necessary for anomaly detection processing from the anomaly detection processing unit 154, and acquires, from the controller unit 140, the ID (i.e., the content of the ID field), the DLC (content of DLC field), data (content of data field), and timing notification information relating to the reception timing of the data frame, that are necessary for the anomaly detection processing.

The frame processing unit 152 processes the data frame notified from the controller communication unit 151.

The frame generating unit 153 notifies the controller communication unit 151 of a transmission request for a data frame.

The anomaly detection processing unit 154 performs anomaly detection processing upon receiving an anomaly detection processing request signal from the anomaly detection processing requesting unit 142 of the controller unit 140. For example, the anomaly detection processing request signal is given as an interruption request signal to the processor of the microcontroller unit 150. If the processor is executing a program for example, the processor discontinues the execution thereof in response to the interruption request signal, and executes a particular interruption-handling processing program determined beforehand, thereby realizing the primary function of the anomaly detection processing unit 154, which is to perform anomaly detection processing. If there is no need to execute any program in particular, the processor may go to a low-power-consumption state (sleep state), if the interruption request signal (anomaly detection processing request signal) is received in this state, the processor cancels the sleep, returns to the normal power consumption state, and executes anomaly detection processing. The anomaly detection processing is processing to determine whether or not a frame sent out onto the bus 300, i.e., a frame which has appeared on the bus 300, is an unauthorized frame. That is to say, this is processing to determine whether or not the frame does not match predetermined rules. This determination is performed based on anomaly detection rules (see FIG. 6) which the anomaly detection rule holding unit 155 holds.

The content of the anomaly detection processing is determined beforehand for each data frame ID regarding which determination is to be made for whether anomaly or not (e.g., stipulated by anomaly detection rules), correlated with anomaly detection processing timing set for each ID by correlation information or the like, for example. That is, the anomaly detection processing unit 154 performs the following inspection as anomaly detection processing according when it operates by having been notified of an anomaly detection processing request signal. In a case where the anomaly detection processing unit 154 operates by having been notified of an anomaly detection processing request signal when receiving an ID in a data frame (i.e., when receiving the ID field), inspection is performed to determine whether or not the ID in the data frame being received (the value of the ID field) is an unauthorized ID (i.e., an unauthorized frame) as the anomaly detection processing, according to whether or not the ID is not stipulated in the anomaly detection rules in the anomaly detection rule holding unit 155. Further, in this case, if the anomaly detection rules stored in the anomaly detection rule holding unit 155 stipulate rules regarding cycles, inspections is performed to determine whether or not the time from receiving the last data from to the time of reception of the data frame this time matches the cycle stipulated in the rules, thereby determining whether or not an unauthorized cycle (i.e., an unauthorized frame).

Also, in a case where the anomaly detection processing unit 154 operates by having been notified of an anomaly detection processing request signal when receiving a DLC in a data frame (i.e., when receiving the DLC field), inspection is performed to determine whether or not an unauthorized DLC (i.e., unauthorized frame) according to whether or not the DLC of the data frame being received differs from the DLC stipulated in the anomaly detection rules.

Also, in a case where the anomaly detection processing unit 154 operates by having been notified of an anomaly detection processing request signal when receiving data in a data frame (i.e., when receiving the data field), inspection is performed to determine whether or not unauthorized data (i.e., unauthorized frame) according to whether or not the values of the data field being received differ from the values stipulated in the anomaly detection rules.

Also, in a case where the anomaly detection processing unit 154 operates by having been notified of an anomaly detection processing request signal after completion of reception of the data frame, inspection is performed to determine whether or not unauthorized the aforementioned unauthorized ID, unauthorized cycle, unauthorized DLC, and unauthorized data, thereby determining whether or not an unauthorized frame. Note that for anomaly detection processing, an inspection may be made regarding consistency of data, in which determination is made that the frame is unauthorized in a case where the data value changes from a data value in the previous data frame by an predetermined amount of change or more.

After having performed the anomaly detection processing, the anomaly detection processing unit 154 notifies the unauthorized frame judging unit 143 of the controller unit 140 regarding the results of the anomaly detection processing, indicating whether or not an anomaly has been detected. Note that the anomaly detection processing unit 154 acquires information necessary for the anomaly detection processing by transmitting an acquisition request notification to the controller communication unit 151 regarding one or more of the ID (i.e., the content of the ID field), the DLC (content of DLC field), data (content of data field), and timing notification information relating to the reception timing of the data frame, that are necessary for the anomaly detection processing.

The anomaly detection rule holding unit 155 holds anomaly detection rules (see FIG. 6) to be referenced by the anomaly detection processing unit 154 in the storage medium (also called recording medium) or the like. The storage medium is, for example, memory included in the anomaly detection ECU 100 (e.g., microcontroller unit 150) for example.

Note that in a case where anomaly of a frame has been detected at the anomaly detection processing unit 154 or the unauthorized frame judging unit 143, log information relating to the unauthorized frame (e.g., content of frame, date-and-time of reception, etc.) may be recorded in the storage medium or the like, and control for notification of the anomaly (display, transmission of information to an external server, etc.) may be performed.

1.5 Correlation Information

FIG. 5 illustrates a list as an example of correlation information which the anomaly detection processing timing holding unit 144 holds. The correlation information is information where multiple IDs and respective timings (anomaly detection processing timings) have been correlated, and is used to decide the timing at which the anomaly detection processing requesting unit 142 makes notification of an interruption request signal (anomaly detection processing request signal). The correlation information in the list exemplified in FIG. 5 is the reception timing of one or multiple particular fields (ID field, DLC field, data field, etc.) in the data frame, correlated as anomaly detection processing timing with each of the one or more IDs. This example indicates that the timing of notification (occurrence) of an anomaly detection processing request signal differs depending on the ID of the data frame being received.

In a case where a data frame with an ID 0x100 is received, the anomaly detection processing requesting unit 142 generates an anomaly detection processing request signal to serve as an interruption request signal for the processor of the microcontroller unit 150 at the time of receiving the ID of the data frame (when the ID field is received), and requests the anomaly detection processing unit 154 to execute anomaly detection processing. In the same way, an anomaly detection processing request signal is generated at both timings of when receiving the ID and receiving data (when the data field is received) for a data frame with an ID 0x200, and an anomaly detection processing request signal is generated at both timings of when receiving the ID and receiving the DLC (when the DLC field is received) for a data frame with an ID 0x400. On the other hand, no anomaly detection processing request signal is generated for a data frame with an ID 0x300. With regard to IDs not included in the list exemplarily illustrated in FIG. 5, the anomaly detection processing requesting unit 142 generates an anomaly detection processing request signal after completion of reception of the data frame. This means the same as correlation information having been stipulated correlating the IDs not included in the list in FIG. 5 with a timing after completion of reception of the data frame (e.g., at the time of completion of reception of the data frame), for example. Note that an arrangement may be made regarding IDs for which no anomaly detection processing request signal is to be generated, where these IDs are not included in the list, and information correlating the IDs of data frames regarding which anomaly detection processing is to be performed after completion of reception of the data frame with a timing after completion of reception of the data frame (e.g., at the time of completion of reception of the data frame), as the correlation information.

1.6 Anomaly Detection Rules

Figures 6, 7:
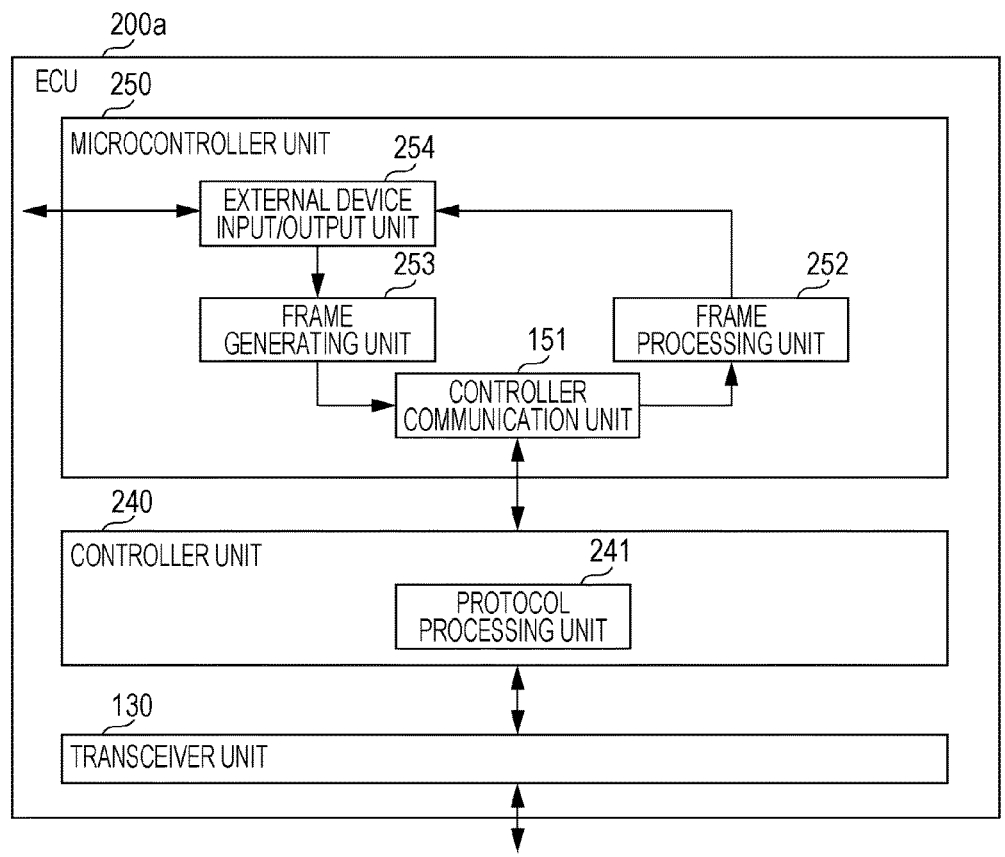
FIG. 6 is a diagram illustrating an example of anomaly detection rules stored in an anomaly detection rule holding unit of the anomaly detection ECU according to the first embodiment.
FIG. 7 is a configuration diagram of an ECU according to the first embodiment.

FIG. 6 illustrates a list as an example of anomaly detection rules that the anomaly detection rule holding unit 155 holds. Anomaly detection rules are information where each of multiple IDs are correlated with inspection contents for detection of anomalies, used by the anomaly detection processing unit 154 at the time of performing inspection that is the content of anomaly detection processing. The list exemplarily illustrated in FIG. 6 has each of one or more IDs correlated with reference information that indicates normal values for the items of DLC, data, and cycle. The reference information is used in the inspection for, for example, matching with a bit string acquired by reception of part of a data frame. "None" is listed for items that are not used in inspection for anomaly detection in the example in FIG. 6, and inspection relating to these items are not performed in the anomaly detection processing.

In the example in FIG. 6, the normal value for DLC of a data frame where the ID is 0x100 is "none", so no inspection is performed regarding DLC, the normal value for data is "none" (meaning that no inspection is performed regarding data), and the normal value of cycle, that represents the reception cycle of the data frame, is 20 ms. The normal value for DLC of a data frame where the ID is 0x200 is "none" so no inspection is performed regarding DLC, the normal value for data is that the highest order byte is 0x20, and the normal value of cycle is "none" so no inspection is performed regarding "cycle". The normal value for DLC of a data frame where the ID is 0x400 is 2, and the normal value for data and cycle is "none" so no inspection is performed regarding data. Note that the anomaly detection rule holding unit 155 may hold the contents of the list regarding anomaly detection rules in an encrypted form. The anomaly detection processing unit 154 does not have to identify all contents of the anomaly detection processing that the anomaly detection processing unit 154 performs based on the list regarding anomaly detection rules, and an arrangement may be made where normal values for one or more item of ID, DLC, data, and cycle are held in the list as anomaly detection rules. The contents of anomaly detection processing determined by the anomaly detection rules, program, and so forth, are not restricted to the examples illustrated here.

1.7 Configuration of ECU 200a

FIG. 7 is a configuration diagram of the ECU 200a. The ECU 200a is configured including the transceiver unit 130, a controller unit 240, and a microcontroller unit 250.

The transceiver unit 130 is the same as the transceiver unit 130 of the anomaly detection ECU 100 (illustrated in FIG. 4), so description will be omitted.

The controller unit 240 is a semiconductor circuit including a digital circuit and a storage medium such as memory or the like, that exchanges signals with the microcontroller unit 250 and transceiver unit 130. The controller unit 240 includes a protocol processing unit 241. The controller unit 240 does not include the anomaly detection processing requesting unit 142 and the unauthorized frame judging unit 143, unlike the controller unit 140 of the anomaly detection ECU 100.

The protocol processing unit 241 performs communication with the transceiver unit 130, and carries out processing following a protocol (CAN protocol or the like). In a case of having detected an error in a frame being received, for example, the protocol processing unit 241 notifies the transceiver unit 130 of transmission of an error frame (i.e., a transmission request), to cause the transceiver unit 130 to transmit an error frame. In a case where transmission of the data frame has been completed, the protocol processing unit 241 notifies the microcontroller unit 250 of completion of reception of the data frame. The protocol processing unit 241 notifies the transceiver unit 130 so as to be able to transmit, in response to a data frame transmission request from the microcontroller unit 250, the data frame in accordance with the protocol.

The microcontroller unit 250 is a semiconductor integrated circuit including a processor that exchanges signals with the controller unit 240 and executes a program, and memory. The microcontroller unit 250 includes, as functional components realized by the processor that executes the program, the memory, and so forth, the controller communication unit 151, a frame processing unit 252, a frame generating unit 253, and an external device input/output unit 254.

The controller communication unit 151 is the same as the controller communication unit 151 of the anomaly detection ECU 100 (see FIG. 4). Note however, that the controller communication unit 151 does not collaborate with the anomaly detection processing unit 154 that the microcontroller unit 250 does not have. That is to say, the controller communication unit 151 notifies a data frame received from the controller unit 240 to the frame processing unit 252. The controller communication unit 151 notifies the controller unit 240 of the data frame notified from the frame generating unit 253, and makes a data frame transmission request.

The frame processing unit 252 processes the data frame transmitted from the controller communication unit 151, and notifies the external device input/output unit 254 of the results.

The frame generating unit 253 generates a data frame based on the values notified from the external device input/output unit 254, and notifies the controller communication unit 151 of the data frame.

The external device input/output unit 254 performs communication with an external device connected to the ECU 200a. That is to say, the external device input/output unit 254 acquires sensor information from the sensor 210, and notifies this to the frame generating unit 253.

The ECU 200b has the same configuration as the ECU 200a. Note however, that the external device input/output unit 254 of the ECU 200b outputs control information, based on the values notified from the frame processing unit 252, to the actuator 220 connected to the ECU 200b, thereby controlling the actuator 220.

1.8 Sequence Relating to Collaborative Operations of Parts of Anomaly Detection ECU 100 when Receiving Data Frame The following is a description of an example of operations of the anomaly detection ECU 100 that is connected to the bus 300 and carries out the anomaly detection method, in a case where an unauthorized ECU has accessed the bus 300 of the onboard network system 10 having the above-described configuration, and has transmitted a data frame of which the ID is 0x100.

Figure 8:
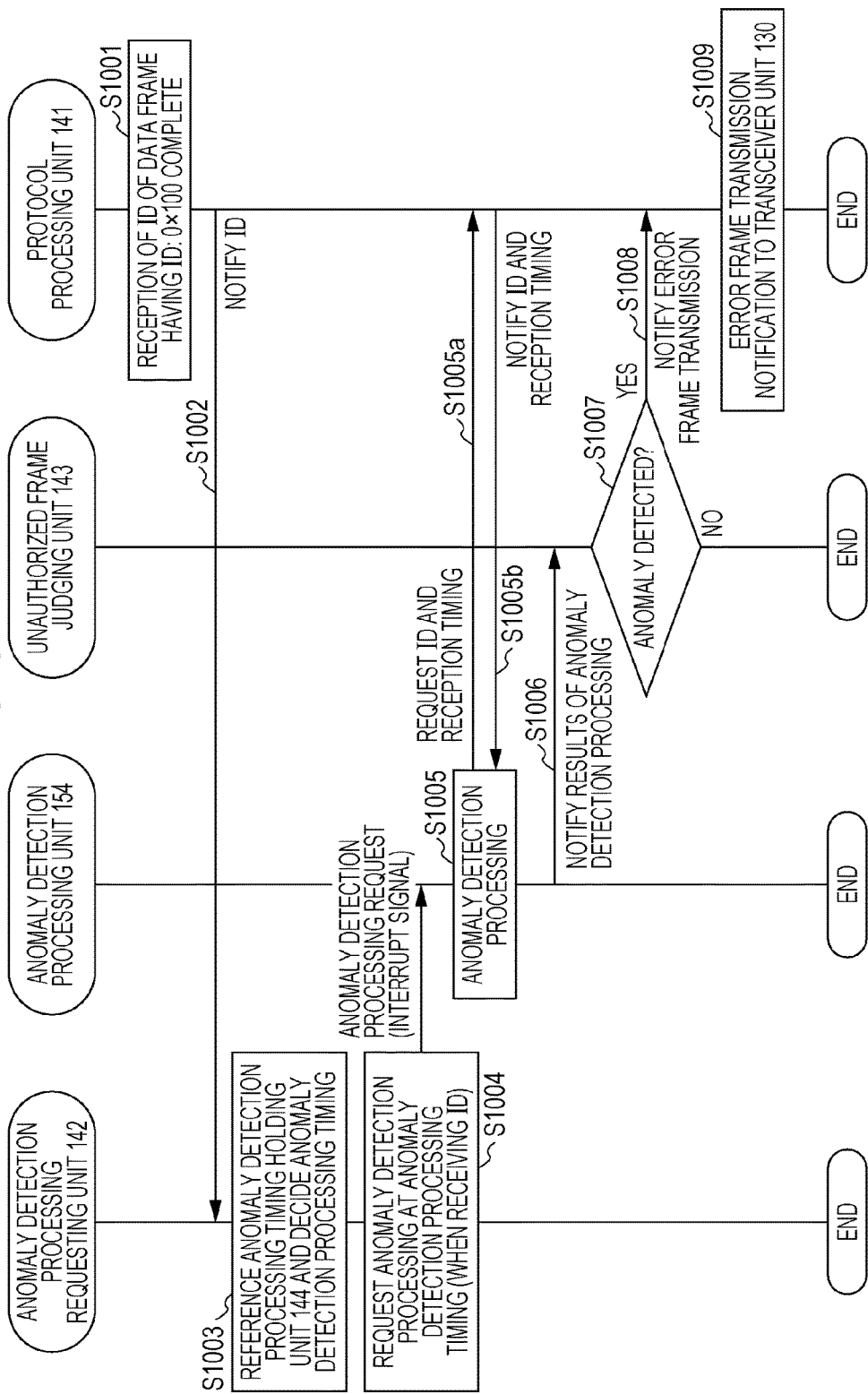
FIG. 8 is a diagram illustrating an example of a processing sequence at the time of reception of a data frame by the anomaly detection ECU according to the first embodiment.

FIG. 8 is a sequence diagram illustrating an example of collaborative operations of the parts of the anomaly detection ECU 100 in a case of having received an unauthorized data frame. Assumption will be made that the anomaly detection processing timing holding unit 144 of the anomaly detection ECU 100 holds the list exemplarily illustrated in FIG. 5 as correlation information, and the anomaly detection rule holding unit 155 holds the list exemplarily illustrated in FIG. 6 as anomaly detection rules. Assumption will also be made that the anomaly detection ECU 100 has received the data frame of which the ID is 0x100 10 ms ago. The sequence diagram in FIG. 8 illustrates the operations relating to transmission of signals among the anomaly detection processing requesting unit 142, anomaly detection processing unit 154, unauthorized frame judging unit 143, and protocol processing unit 141 by arrows. The operations at each of the parts are indicated by rectangular blocks downwards from above following the flow of time.

Upon the data frame of which the ID is 0x100 is transmitted to the bus 300, the protocol processing unit 141 of the controller unit 140 of the anomaly detection ECU 100 receives the ID of that data frame (i.e., 0x100, which is the value of the ID field) from the bus 300 via the transceiver unit 130 (Step S1001). The protocol processing unit 141 that has received the ID notifies the anomaly detection processing requesting unit 142 of the ID (received ID) of the data frame being received (step S1002).

The anomaly detection processing requesting unit 142 references the correlation information that the anomaly detection processing timing holding unit 144 holds, and decides an anomaly detection processing timing corresponding to the ID that has been notified (step S1003). According to the example of correlation information in FIG. 5, the timing of receiving the ID, that corresponds to the 0x100 which is the ID of the received data frame, is decided to be the anomaly detection processing timing.

The anomaly detection processing requesting unit 142 requests execution of anomaly detection processing by inputting an interruption request signal (anomaly detection processing request signal) to the processor of the microcontroller unit 150 at the point that the anomaly detection processing timing decided in step S1003 arrives (step S1004). The execution timing of the anomaly detection processing is controlled by the timing of transmission of the interruption request signal from the controller unit 140 to the microcontroller unit 150 (interruption at the processor). If the anomaly detection processing timing is at the time of ID reception, an anomaly detection processing request signal (interruption request signal) is immediately notified to the anomaly detection processing unit 154, since it is the time of reception of the ID. Note that if the anomaly detection processing timing that has been decided is the time of reception of the DLC for example, the anomaly detection processing request signal is notified to the anomaly detection processing unit 154 after having awaited for the time at which the DLC is received. If the anomaly detection processing timing that has been decided is the time of completion of reception of the data frame for example, the anomaly detection processing request signal is notified to the anomaly detection processing unit 154 after having awaited for the time at which reception of the data frame is completed.

Upon receiving the interruption request signal, the processor in the microcontroller unit 150 executes the interruption-handling processing program, whereby the anomaly detection processing unit 154 executes anomaly detection processing (step S1005). In the anomaly detection processing, the anomaly detection processing unit 154 transmits an acquisition request notification to the protocol processing unit 141 of the controller unit 140 for acquisition of the ID received from the bus 300 and timing notification information relating to reception cycle, via the controller communication unit 151 (step S1005a). In response to this, the anomaly detection processing unit 154 receives the ID and timing notification information that the protocol processing unit 141 transmits, via the controller communication unit 151 (step S1005b). The anomaly detection processing unit 154 inspects the acquired ID and timing notification information in the anomaly detection processing, based on the anomaly detection rules. The acquired ID is determined in this inspection to be a normal ID, since it is included in the list serving as anomaly detection rules in FIG. 6, but the reception timing that the timing notification information indicates has elapsed 10 ms from the previous reception, for example, which is different from the 20 ms stipulated in the list of anomaly detection rules in FIG. 6, and accordingly is distinguished as being an unauthorized cycle. Accordingly, the anomaly detection processing unit 154 notifies the unauthorized frame judging unit 143 of the controller unit 140 that an unauthorized frame has been detected, as the results of the anomaly detection processing (step S1006).

Upon having received the results of the anomaly detection processing, the unauthorized frame judging unit 143 distinguishes whether or not an anomaly has been detected in the anomaly detection processing (step S1007), and in a case where an anomaly has been detected in the anomaly detection processing, notifies (makes a transmission request to) the protocol processing unit 141 of transmission of an error frame (step S1008).

In a case where transmission of an error frame has been notified from the unauthorized frame judging unit 143, the protocol processing unit 141 notifies the transceiver unit 130 of transmission (transmission request) of an error frame (step S1009). Accordingly, the transceiver unit 130 sends an error frame out onto the bus 300. The remaining portion of the data frame partway through being transmitted over the bus 300 (the data frame regarding which the ID is 0x100 and as far as the ID field has been transmitted) is overwritten by the error frame so as to say, with the error frame made up of consecutive dominants being given priority over recessives. Accordingly, the ECUs 200a and 200b connected to the bus 300 can be prevented from operating in response to the unauthorized data frame (unauthorized operations). This also prevents the ECUs 200a and 200b from consuming electric power unnecessarily due to operating in response to the unauthorized data frame. Note that the above example, the anomaly detection ECU 100 transmits an error frame if an anomaly is detected, since the anomaly detection processing is being performed at the time of ID reception, but if anomaly detection is performed at the time of completion of reception of the data frame, no error frame is transmitted, and control may be made such as recording log information, annunciation of an anomaly, and so forth, for example.

1.9 Processing at Time of Anomaly Detection ECU 100 when Receiving Data Frame Processing performed at the time of the anomaly detection ECU 100 receiving a data frame will be described with reference to the flowchart in FIG. 9. The anomaly detection ECU 100 receives up to the ID field of the data frame from the bus 300, thereby acquiring the ID field of the data frame (step S1101).

The anomaly detection ECU 100 references the correlation information held by the anomaly detection processing timing holding unit 144 using the anomaly detection processing requesting unit 142, and decides the anomaly detection processing timing corresponding to the acquired ID of the data frame (step S1102). Accordingly, one or multiple of when receiving the ID, when receiving the DLC, when receiving data, and when reception of the data frame is completed, is decided as the anomaly detection processing timing in accordance with the received ID.

The anomaly detection ECU 100 determines whether or not the decided anomaly detection processing timing has arrived (step S1103) using the anomaly detection processing requesting unit 142. If the anomaly detection processing timing has not arrived, determination is made regarding whether or not reception of the data frame has been completed (Step S1104), and if not completed, the next one bit appearing on the bus 300 is received by the protocol processing unit 141 and so forth (step S1105) and the flow returns to the determination in step S1103. Upon reception of the data frame being completed, the anomaly detection ECU 100 notifies completion of reception of the data frame to the microcontroller unit 150, using the protocol processing unit 141. If reception of the data frame is completed in the determination in step S1104, the anomaly detection ECU 100 ends the processing performed when receiving a data frame.

In a case where determination is made in step S1103 that the anomaly detection processing timing has arrived, the anomaly detection ECU 100 inputs an interruption request signal (anomaly detection processing request signal) to the processor of the microcontroller unit 150 from the anomaly detection processing requesting unit 142 of the controller unit 140, thereby executing anomaly detection processing based on anomaly detection rules using the anomaly detection processing unit 154 (step S1106).

In a case of detecting an anomaly as a result of the anomaly detection processing by the anomaly detection processing unit 154 while receiving a data frame (step S1107), the anomaly detection ECU 100 sends out an error frame onto the bus 300, thereby performing transmission of the error frame (Step S1108). In a case where the results of the anomaly detection processing are normal (a case where no anomaly was detected), or in a case where an anomaly is detected as the result of anomaly detection processing after the data frame has been received, the anomaly detection ECU 100 does not transmit an error frame, and rather performs the determination in step S1104.

Figure 9:
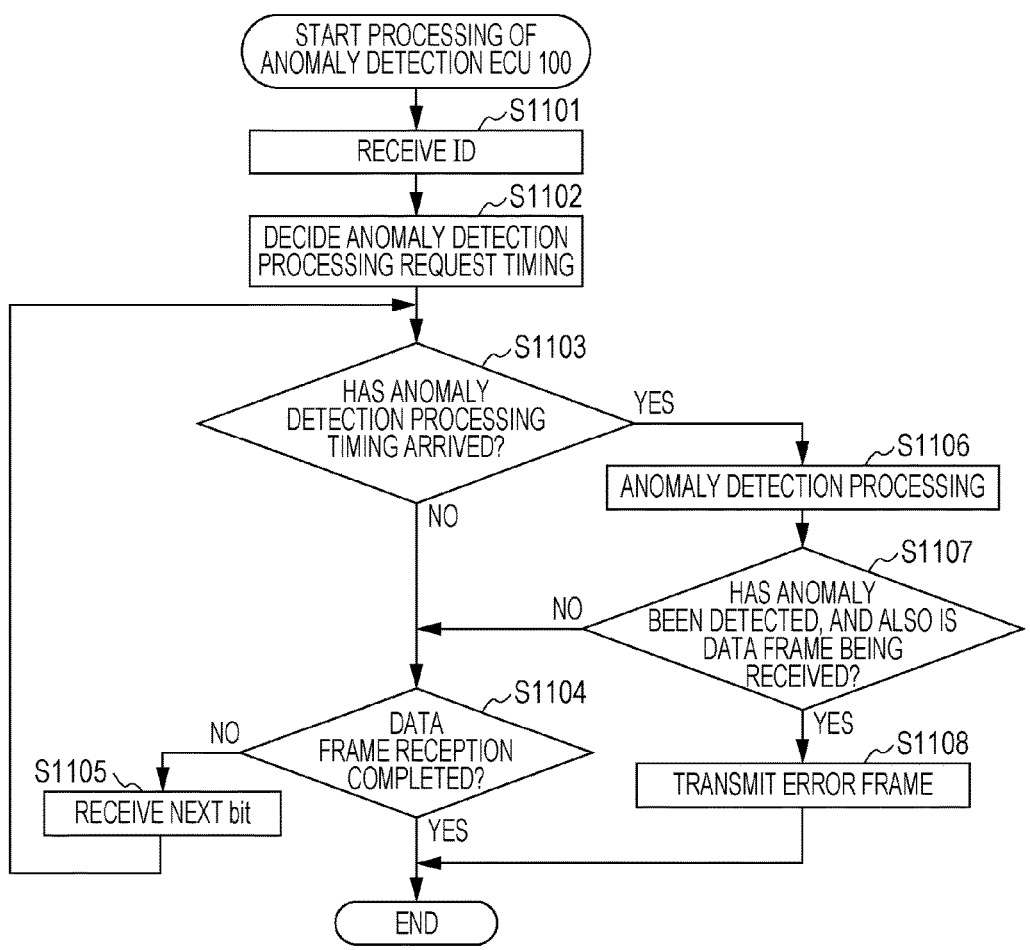
FIG. 9 is a flowchart illustrating data frame reception processing at the anomaly detection ECU according to the first embodiment.

The processing illustrated in FIG. 9 is repeatedly performed each time the ID of a data frame is received. For example, if the ID of the data frame is a first value (e.g., 0x100, 0x200, etc.), the anomaly detection processing requesting unit 142 decides the anomaly detection processing timing to be the timing when receiving the data frame. If the ID of the data frame is a second value that is different from the first value (e.g., 0x500, etc.), the anomaly detection processing timing is decided to be the timing after receiving the data frame (e.g., when reception of the data frame is completed). In this case, the anomaly detection ECU 100 sends an error frame out onto the bus 300 when an anomaly is detected in the anomaly detection processing performed by the anomaly detection processing unit 154 at the timing of when receiving the data frame, but does not send out an error frame when an anomaly is detected in the anomaly detection processing performed at the timing of after receiving the data frame. Deciding the anomaly detection processing timing in this way is useful in a case where the data frame including an ID of the first value necessitates speedy anomaly detection for security reasons, and where the data frame including an ID of the second value does not necessitate speedy anomaly detection.

1.10 Advantages of First Embodiment

In the onboard network system 10 according to the first embodiment, the anomaly detection ECU 100 decides an anomaly detection processing timing in accordance with the ID of a received data frame, based on correlation information held in the anomaly detection processing timing holding unit 144, and performs anomaly detection processing at the decided anomaly detection processing timing. Accordingly, instead of performing uniform monitoring for each data frame transmitted over the bus 300 to ensure security, anomaly detection processing is performed at suitable timings in accordance with the IDs of the data frames, so efficient detection of unauthorized frames can be realized. For example, deciding correlation information with two or more of when receiving ID, when receiving DLC, and when receiving data, correlated in accordance with an ID of a data frame that is important from a security perspective, enables several of ID, data frame reception cycle, DLC, and data (content of data field) to be speedily inspected. Other ECUs can then be speedily prevented from performing unauthorized operations and the like, by transmitting an error frame when an anomaly is detected. When the anomaly detection processing timing arrives, the processor of the microcontroller unit 150 is notified by an interruption request signal from the controller unit 140, so the processor can remaining at a low-power-consumption state (sleep state), for example, until the interruption request signal is input, and can return to the low-power-consumption state if no processing is necessary after the anomaly detection processing ends. Also, by deciding correlation information corresponding to the ID of a frame of which importance is relatively low, so as to be correlated after receipt of the data frame is completed, the ID, data frame reception cycle, DLC, data (content of data field), and so forth can be inspected in a single anomaly detection processing after completion of reception of the data frame, so security can be ensured with suppressed electric power consumption.

Second Embodiment

An onboard network system 11, which is a partial modification of the onboard network system 10 illustrated in the first embodiment, will be described below. The anomaly detection ECU 100 of the onboard network system 10 according to the first embodiment decides the anomaly detection processing timing for executing the anomaly detection processing to detect anomalies regarding data frames transmitted over the bus 300 in accordance with the ID of the data frame. In contrast with this, the onboard network system 11 according to the present embodiment has an anomaly detection ECU 2100 that decides the anomaly detection processing timing in accordance with not only the ID of the data frame, but also the state of the vehicle in which the onboard network system 11 including the bus 300 and so forth is installed, and the state of anomaly (i.e., the results of the anomaly detection processing). The anomaly detection ECU 2100, which is a partial modification of the anomaly detection ECU 100, decides the anomaly detection processing timing in accordance with a monitoring level, that is identified from the ID of the data frame, the state of the vehicle, and the state of anomaly.

2.1 Overall Configuration of Onboard Network System 11

Figure 10:
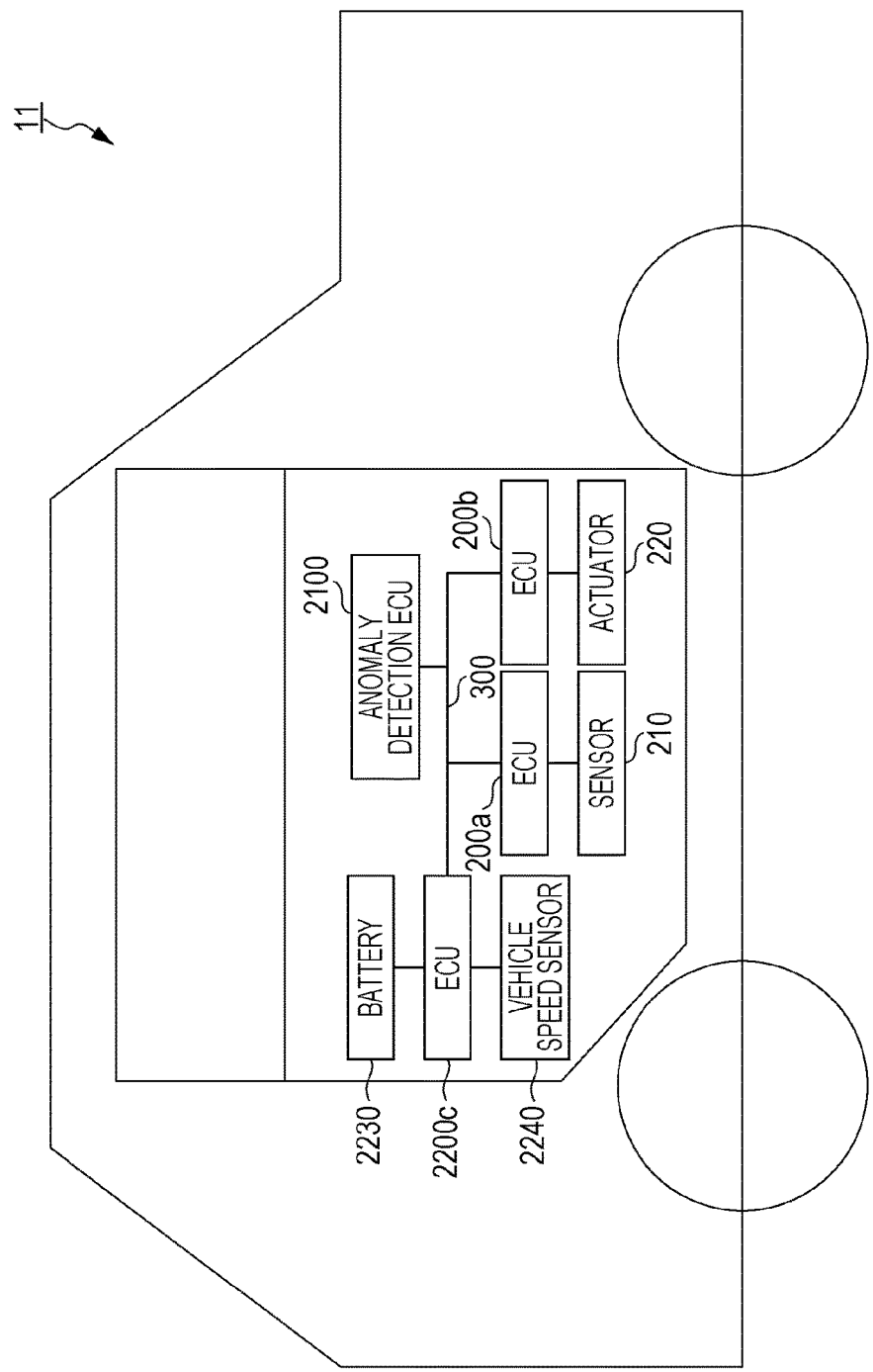
FIG. 10 is a diagram illustrating the overall configuration of an onboard network system according to a second embodiment.

FIG. 10 is a diagram illustrating the overall configuration of the onboard network system 11 according to the second embodiment. The onboard network system 11 is configured including the bus 300, and nodes connected to the bus such as the ECUs like the anomaly detection ECU 2100, and ECUs 200a, 200b, and 2200c and so forth, as illustrated in FIG. 10. Components which have the same functions as those in the first embodiment are denoted by the same reference numerals, and description thereof will be omitted. The onboard network system 11 is the same as the onboard network system 10 with regard to points that are not illustrated in particular in the present embodiment.

The ECU 2200c is connected to the bus 300, and also connected to a battery 2230 and vehicle speed sensor 2240. By acquiring information from these, the ECU 2200c can identify which of stopped, charging, driving, and high-speed driving the current state of the vehicle is, and send a data frame indicating the identified state of the vehicle out onto the bus 300. Stopped here means a state where the vehicle speed is zero and other than charging (charging of the battery 2230). Driving means a state where the vehicle is running but not at high speed. Driving at high speed indicates a state where the vehicle speed is at a certain speed (e.g., 60 Km/hour) or faster. The ECU 2200c has the same configuration as the ECU 200a, so description will be omitted here (see FIG. 7). The battery 2230 is a power source for supplying electric power to the ECUs and so forth.

The anomaly detection ECU 2100 is a partial modification of the anomaly detection ECU 100 (see FIG. 4) is connected to the bus 300, and has a function of monitoring frames flowing over the bus, and performs anomaly detection processing to distinguish whether or not unauthorized frames are flowing over the bus 300.

2.2 Configuration of Anomaly Detection ECU 2100

Figure 11:
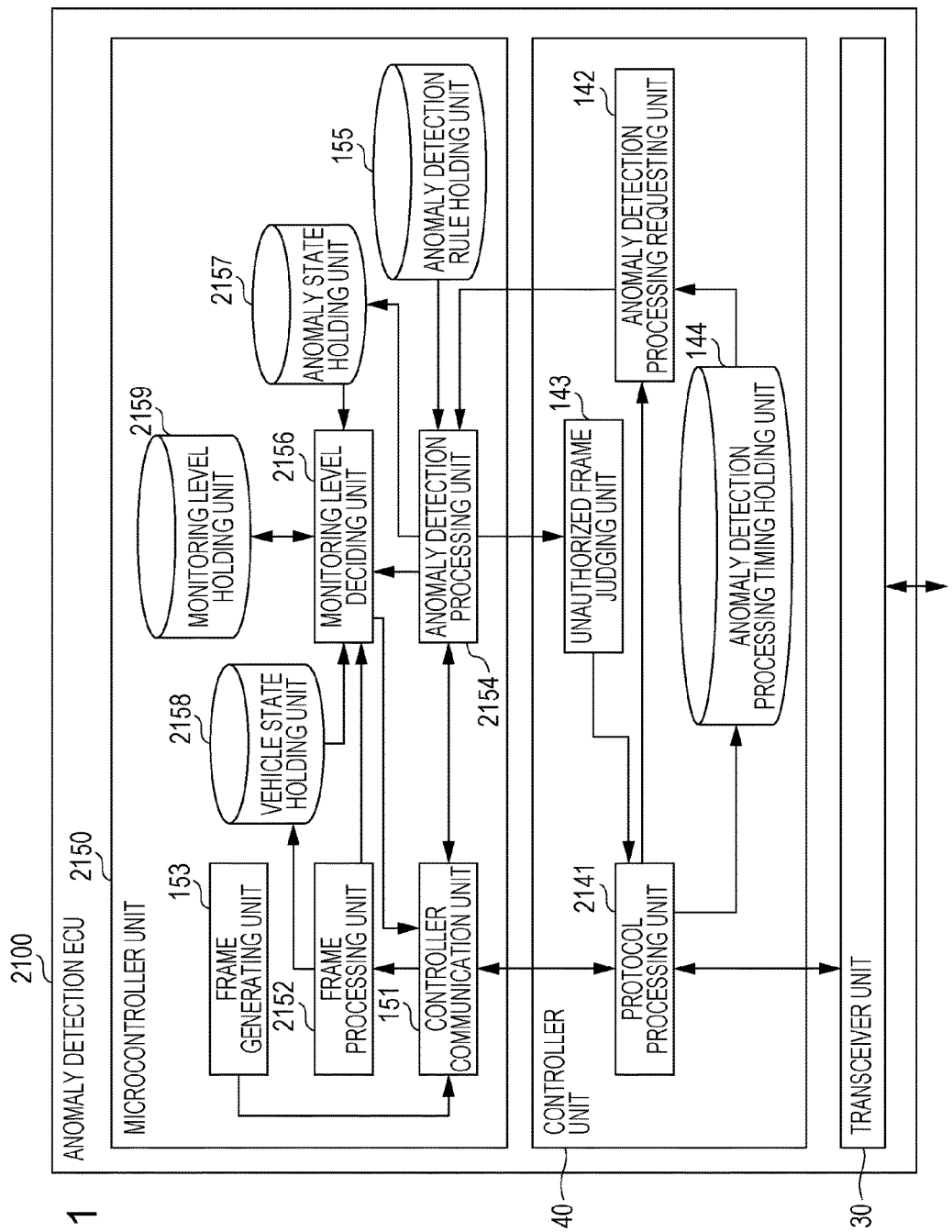
FIG. 11 is a configuration diagram of an anomaly detection ECU according to the second embodiment.

FIG. 11 is a configuration diagram of the anomaly detection ECU 2100. The anomaly detection ECU 2100 is configured including the transceiver unit 130, a controller unit 2140, and a microcontroller unit 2150. Components which have the same functions as in the first embodiment are denoted by the same reference numerals, and description thereof will be omitted.

The controller unit 2140 is a partial modification of the controller unit 140, and is a semiconductor integrated circuit that includes a digital circuit and memory and so forth, and that exchanges signals with the microcontroller unit 2150 and transceiver unit 130. The controller unit 2140 includes a protocol processing unit 2141, the anomaly detection processing requesting unit 142, the unauthorized frame judging unit 143, and the anomaly detection processing timing holding unit 144.

The protocol processing unit 2141 has, in addition to the functions of the protocol processing unit 141 illustrated in the first embodiment, a function of updating correlation information which the anomaly detection processing timing holding unit 144 holds in a case where the controller communication unit 151 notifies an update request of the anomaly detection processing timing holding unit 144.

The microcontroller unit 2150 is a semiconductor integrated circuit including a processor that exchanges signals with the controller unit 2140 and executes a program, and memory. The program is stored in the memory of the semiconductor integrated circuit, for example. Alternatively, in a case where the anomaly detection ECU 2100 includes a hard disk device omitted from illustration, the program may be recorded in the hard disk device. The microcontroller unit 2150 functions by the processor executing this program. The microcontroller unit 2150 includes, as functional components realized by the processor that executes the program, the memory, and so forth, the controller communication unit 151, a frame processing unit 2152, the frame generating unit 153, an anomaly detection processing unit 2154, the anomaly detection rule holding unit 155, a monitoring level deciding unit 2156, an anomaly state holding unit 2157, a vehicle state holding unit 2158, and a monitoring level holding unit 2159.

The frame processing unit 2152 processes a data frame notified from the controller communication unit 151. As an example of processing of a data frame, the frame processing unit 2152 analyzes a data frame notified from the ECU 2200c to acquire the state of the vehicle, and stores vehicle state information indicating the state of the vehicle in the vehicle state holding unit 2158. In a case of having updated the vehicle state information, the frame processing unit 2152 notifies the monitoring level deciding unit 2156 to the effect that the vehicle state information has been updated.

The anomaly detection processing unit 2154 is a partial modification of the anomaly detection processing unit 154, and receives anomaly detection processing request signals from the controller unit 2140 and performs anomaly detection processing. For example, the anomaly detection processing request signal is given as an interruption request signal to the processor of the microcontroller unit 2150. What is included in the anomaly detection processing is the same as the anomaly detection processing performed by the anomaly detection processing unit 154 in the first embodiment. After having performed the anomaly detection processing, the anomaly detection processing unit 2154 notifies the unauthorized frame judging unit 143 of the controller unit 2140 of the results of anomaly detection processing, indicating whether or not an anomaly was detected. The anomaly detection processing unit 2154 transmits to the controller communication unit 151 one or more of the ID (i.e., the content of the ID field), the DLC (content of DLC field), data (content of data field), and timing notification information relating to the reception timing of the data frame, that are necessary for the anomaly detection processing, thereby acquiring information necessary for the anomaly detection processing. The anomaly detection processing unit 2154 also has a function of acquiring the current time. In a case where determination is made of an unauthorized frame as the result of the anomaly detection processing, the anomaly detection processing unit 2154 updates the number of times of detection of this ID in anomaly state information (see FIG. 14) stored in the anomaly state holding unit 2157 (also called anomaly occurrence count), and the latest update time. At this time, if there is a time difference between the last update time before updating the anomaly occurrence count and the current time that is a certain level or longer, the anomaly occurrence count is reset to zero. In a case of having updated the anomaly state information, the anomaly detection processing unit 2154 notifies the monitoring level deciding unit 2156 that the anomaly state information has been updated.

The monitoring level deciding unit 2156 references the anomaly state holding unit 2157 and vehicle state holding unit 2158 when the anomaly detection processing unit 2154 notifies that the anomaly state information has been updated and when the frame processing unit 2152 notifies that the vehicle state information has been updated, and decides the monitoring level for each ID. The monitoring level deciding unit 2156 compares the decided monitoring level and the monitoring level up to now that monitoring level information held in the monitoring level holding unit 2159 indicates, and if these do not agree, the monitoring level information is updated to indicate the decided monitoring level. In a case of having updated the monitoring level information, the monitoring level deciding unit 2156 notifies an update request via the controller communication unit 151 so as to rewrite the anomaly detection processing timing in the correlation information that the anomaly detection processing timing holding unit 144 of the controller unit 2140 holds, based on anomaly detection processing timing identifying information (see FIG. 12) in accordance with the monitoring level. The monitoring level deciding unit 2156 decides the monitoring level based on the table (correlation table) exemplarily illustrated in FIGS. 13A through 13D, for example. This method of deciding the monitoring level will be described later.

The anomaly state holding unit 2157 holds the anomaly state information (see FIG. 14) indicating the state of anomaly found from the results of the anomaly detection processing performed by the anomaly detection processing unit 2154. Specifically, the anomaly state information is information that is updated to indicate the number of anomalies detected (anomaly occurrence count) in the anomaly detection processing already performed for each data frame ID (each ID correlated with an anomaly detection processing timing by correlation information).

The vehicle state holding unit 2158 holds the vehicle state information (see FIG. 15) indicating the state of the vehicle that the frame processing unit 2152 has acquired from data frames transmitted from the ECU 2200c.

The monitoring level holding unit 2159 holds monitoring level information (see FIG. 16) indicating the monitoring level for each ID.

2.3 Anomaly Detection Processing Timing Identifying Information

FIG. 12 is a diagram illustrating an example of anomaly detection processing timing identifying information. The anomaly detection processing timing identifying information indicates the correlation between the monitoring level and the anomaly detection processing timing, as illustrated in FIG. 12. The monitoring level deciding unit 2156 identifies the anomaly detection processing timing corresponding to a decided monitoring level in accordance with this anomaly detection processing timing identifying information, and updates the correlation information which the anomaly detection processing timing holding unit 144 holds so as to indicate the anomaly detection processing timing that has been identified. In the example in FIG. 12, the monitoring level is divided into four stages of 0 through 3. Note that this is but one example, and that the monitoring level may be section into any number of stages.

The following processing is performed at the anomaly detection ECU 2100 due to the anomaly detection processing timing identifying information exemplarily illustrated in FIG. 12, in accordance with the monitoring level. That is to say, in a case where the monitoring level is 0, no anomaly detection processing is performed. In a case where the monitoring level is 1, an anomaly detection processing request signal is notified to the anomaly detection processing unit 2154 at the time of completion of reception of the data frame, and anomaly detection processing is started. In a case where the monitoring level is 2, an anomaly detection processing request signal is notified to the anomaly detection processing unit 2154 at the time of ID reception (i.e., when the ID field of the data frame is received). In a case where the monitoring level is 3, an anomaly detection processing request signal is notified to the anomaly detection processing unit 2154 at each point of receiving the ID, receiving the DLC (when receiving the field of the DLC), and receiving data (when receiving the data field), and anomaly detection processing is started. The anomaly detection processing is performed while receiving the data frame in the case of monitoring levels 2 and 3, so in a case where an anomaly is detected in the data frame during the anomaly detection processing, the unauthorized data frame can be invalidated by sending an error frame out onto the bus 300 and overwriting the unauthorized data frame. An example is illustrated here where the highest stage 3 of the four stages of monitoring level performs inspection quicker than or more wide-ranging than 0 through 2. Appropriately setting the monitoring level identified from the vehicle state and the anomaly occurrence count, and the anomaly detection processing timing is useful. Note that the content of the anomaly detection processing timing identifying information is not restricted to the example illustrated in FIG. 12.

2.4 Method of Deciding Monitoring Level

FIGS. 13A through 13D are diagrams illustrating examples of tables used by the monitoring level deciding unit 2156 for deciding the monitoring level. FIGS. 13A through 13D illustrate an example where a different table is set for each ID. FIG. 13A shows a table for identifying the monitoring level from the state of the vehicle and the number of time that an anomaly has been detected (anomaly occurrence count) with regard to ID "0x100", FIG. 13B ID "0x200", FIG. 13C ID "0x300", and FIG. 13D ID "0x400". The monitoring level deciding unit 2156 decides the monitoring level in accordance with the state of the vehicle and the anomaly occurrence count, following each of these tables. According to the example in FIGS. 13A through 13D, if the state of the vehicle is stopped with regard to a data frame where the ID is 0x100, the monitoring level is 0 regardless of how many times an anomaly has been detected. If the state of the vehicle is charging with regard to a data frame where the ID is 0x100, the monitoring level is decided to be 1 if the number of time that an anomaly has been detected is four times or less, and the monitoring level is decided to be 3 if the number of time that an anomaly has been detected is five times or more. If the state of the vehicle is driving with regard to a data frame where the ID is 0x100, the monitoring level is decided to be 2 if the number of time that an anomaly has been detected is four times or less, and the monitoring level is decided to be 3 if the number of time that an anomaly has been detected is five times or more. If the state of the vehicle is driving at high speed with regard to a data frame where the ID is 0x100, the monitoring level is 3 regardless of how many times an anomaly has been detected. The monitoring level is decided for the IDs 0x200, 0x300, and 0x400, in the same way, based on the vehicle state and the anomaly occurrence count. Note that the monitoring level for data frames of which the ID is not in any of the tables in FIGS. 13A through 13D is set to 1. Appropriately setting the height of the monitoring level in accordance with the necessity for monitoring due to anomaly detection processing, for example, is useful.

The example of the table in FIG. 13A is an example assuming a case where the data frame of ID 0x100 is a control data frame relating to cruise control, that is primarily transmitted while driving, regarding which anomaly detection needs to be performed at a relatively high monitoring level while driving. The example of the table in FIG. 13B is an example assuming a case where the data frame of ID 0x200 is a data frame relating to charging control, regarding which anomaly detection needs to be performed at a higher monitoring level while charging. The example of the table in FIG. 13C is an example assuming a case where the data frame of ID 0x300 is a data frame relating to remaining battery charge notification. The example of the table in FIG. 13D is an example assuming a case where the data frame of ID 0x400 is a data frame relating to ECU state notification that will not affect vehicle control adversely right away, and in the case the anomaly occurrence count increases, the monitoring level is raised, so as to maintain a safe state of the vehicle. Appropriately setting the monitoring level with regard to the relationship of vehicle state or anomaly occurrence count, in accordance with the characteristics of data frames distinguished by IDs, enables anomaly detection processing to be efficiently performed with reduced electric power consumption.

2.5 Anomaly State Information

FIG. 14 is a diagram illustrating an example of anomaly state information held by the anomaly state holding unit 2157. The anomaly state information is information recording the number of times that anomalies have been detected (anomaly occurrence count) and the final update time indicating the time at which the anomaly state information was last updated, for each data frame ID, as shown in FIG. 14. This anomaly state information is updated each time the anomaly detection processing unit 2154 detects an anomaly in a data frame.

In the example in FIG. 14, the anomaly occurrence count is 0 times for the data frames of IDs 0x100, 0x200, and 0x300, the final update time is when starting (e.g., when supply of power to the onboard network system was started), still set to the initial value set when starting. With regard to the data frame where the ID is 0x400, the anomaly occurrence count is 3 times, and the final update time is 20 minutes after starting.

2.6 Vehicle State Information

FIG. 15 is a diagram illustrating an example of vehicle state information held in the vehicle state holding unit 2158. The vehicle state information exemplarily illustrated in FIG. 15 indicates that the state of the vehicle is charging. The vehicle state information is updated by the frame processing unit 2152 acquiring the state of the vehicle by analyzing a data frame notified from the ECU 2200c, and updating the state of the vehicle as illustrated. The state of the vehicle may be one of the four of stopped, charging, driving, and driving at high speed.

2.7 Monitoring Level Information

FIG. 16 is a diagram illustrating an example of the monitoring level information that is held in the monitoring level holding unit 2159. The monitoring level information indicates the monitoring level of each ID with regard to data frames including that ID.

The example in FIG. 16 illustrates a state where the monitoring level for a data frame where the ID is 0x100 is 1, the monitoring level for a data frame where the ID is 0x200 is 2, the monitoring level for a data frame where the ID is 0x300 is 3, and the monitoring level for a data frame where the ID is 0x400 is 0. The monitoring level is divided into the four stages of 0 through 3.

2.8 First Example of Operations of Anomaly Detection ECU 2100 that Change According to Updating of Monitoring Level FIG. 17 is a diagram illustrating an example of the operations of the anomaly detection ECU 2100 that change according to updating of the monitoring level. FIG. 17 illustrates an example of operations in a case where the monitoring level is updated in accordance with change of the state of the vehicle. It will be assumed that the anomaly state information held in the anomaly state holding unit 2157 of the anomaly detection ECU 2100 is in the state exemplarily illustrated in FIG. 14. At this time, the anomaly detection ECU 2100 has not detected a single anomaly regarding a data frame of which the ID is 0x100.

First, a data frame notifying that the vehicle is stopped is sent out onto the bus 300 from the ECU 2200c, as illustrated in FIG. 17. The anomaly detection ECU 2100 receives this data frame, and thereby updates the vehicle state information to indicate stopped, and decides the monitoring level to be 0 for the data frame of which the ID is 0x100, based on the table exemplarily illustrated in FIG. 13A. Next, a data frame of which the ID is 0x100 flows on the bus 300. The monitoring level for this data frame is 0, so the anomaly detection ECU 2100 does not perform anomaly detection processing. Next, upon the vehicle in which the onboard network system 11 is installed starts to drive, a data frame notifying that the vehicle is driving is sent out onto the bus 300 from the ECU 2200c. The anomaly detection ECU 2100 receives this data frame, and thereby updates the vehicle state information to indicate driving, and decides the monitoring level to be 2 for the data frame of which the ID is 0x100, based on the table exemplarily illustrated in FIG. 13A. Accordingly, the monitoring level of the anomaly detection ECU 2100 regarding the data frame with the ID 0x100 is 2. Thus, when a data frame of which the ID is 0x100 flows on the bus 300 next, this data frame is subjected to anomaly detection processing (inspection to distinguish whether or not the ID is unauthorized, and whether or not the data frame cycle is unauthorized) at the time of receiving the ID (See FIG. 12).

Figure 18:
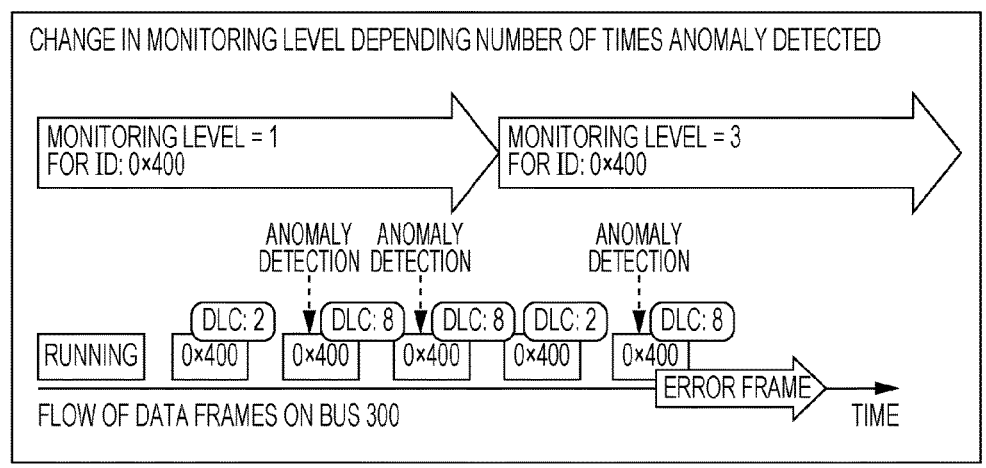
FIG. 18 is a diagram illustrating an example of change in operations of the anomaly detection ECU according to the second embodiment (change in accordance with change in increase in number of times of anomaly detection)

2.9 Second Example of Operations of Anomaly Detection ECU 2100 that Change According to Updating of Monitoring Level FIG. 18 is a diagram illustrating another example of the operations of the anomaly detection ECU 2100 that change according to updating of the monitoring level. FIG. 18 illustrates an example of operations in a case where the monitoring level is updated in accordance with an increase in the number of times that anomalies are detected. It will be assumed that the anomaly state information held in the anomaly state holding unit 2157 of the anomaly detection ECU 2100 is in the state exemplarily illustrated in FIG. 14. At this time, the anomaly detection ECU 2100 has already detected anomalies regarding data frames of which the ID is 0x400 three times.

First, a data frame notifying that the vehicle is driving is sent out onto the bus 300 from the ECU 2200c, as illustrated in FIG. 18. The anomaly detection ECU 2100 receives this data frame, and thereby updates the vehicle state information to indicate driving. The monitoring level is 1 for the data frame of which the ID is 0x400, according to the table exemplarily illustrated in FIG. 13D. Next, a data frame of which the ID is 0x400 flows on the bus 300. The monitoring level for this data frame is 1, so the anomaly detection ECU 2100 performs anomaly detection processing at the time the reception of the data frame is complete, to distinguish whether or not the ID and DLC are unauthorized (see FIGS. 6 and 12). Thereafter, second and third data frames with the ID 0x400 flow over the bus 300 (but these are data frames in which the DLC is an unauthorized value 8). As a result of anomaly detection processing, the anomaly detection ECU 2100 distinguishes that the data frames of ID 0x400 received the second and third time are unauthorized since the DLC is 8. Accordingly, the anomaly state information is updated, and the number of times of detection of an anomaly reaches five, so the monitoring level goes to 3 (see FIGS. 13A through 13D). Thereafter, the anomaly detection ECU 2100 performs anomaly detection of data frames having the ID 0x400 during reception of the data frames (at the time of receiving the ID and at the time of receiving the DLC) (see FIGS. 6 and 12). Accordingly, the data frame of ID 0x400 received the fifth time (a data frame where the DLC is an unauthorized value 8) is distinguished to be an unauthorized DLC while receiving the data frame. The data frame is thus detected as being unauthorized, and an error frame is transmitted while receiving the data frame. Consequently, the unauthorized data frame on the bus 300 is overwritten and invalidated.

Note that in this example, in a case where the vehicle state information is driving, the anomaly detection processing timing holding unit 144 updates the anomaly detection processing timing for ID 0x400 in the correlation information so that the more times anomalies are detected in the anomaly state information (anomaly occurrence count), the more items of when receiving ID, when receiving DLC, when receiving data, and when reception of data frame is completed, are used for the reception timing. That is to say, the number of anomaly detection processing timings increases from when reception of data frame is completed, to when receiving ID and when receiving DLC, due to the anomaly occurrence count increasing. Thus, an arrangement may be made where the more times anomalies are detected (anomaly occurrence count) for an ID in the anomaly state information, the more reception timings of when receiving ID, when receiving DLC, when receiving data, and when reception of data frame is completed, are correlated in the correlation information, for each of the multiple IDs.

Figure 19:
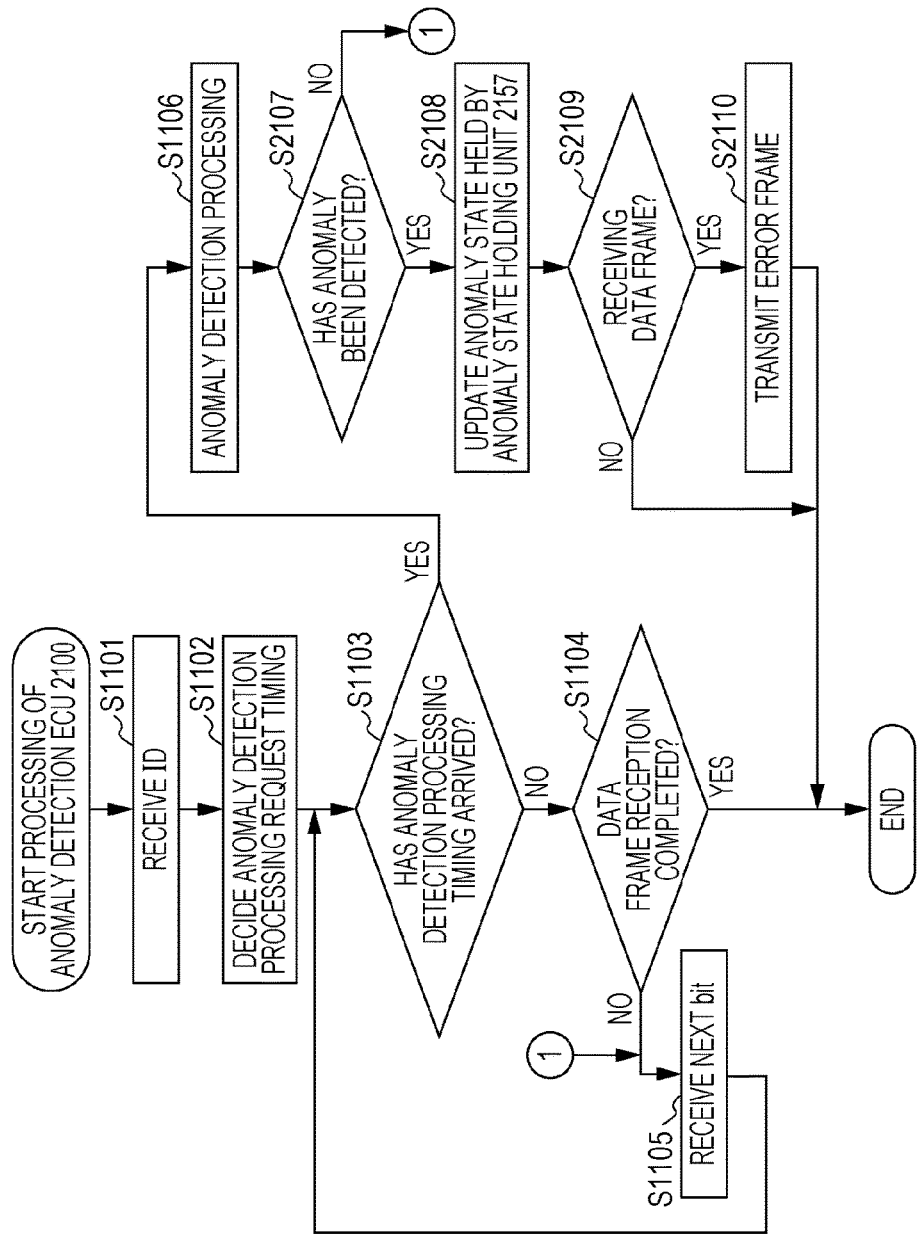
FIG. 19 is a flowchart illustrating an example of processing at the time of reception of a data frame by the anomaly detection ECU according to the second embodiment.

2.10 Processing at Time of Anomaly Detection ECU 2100 Receiving Data Frame Processing performed at the time of the anomaly detection ECU 2100 receiving a data frame will be described with reference to the flowchart in FIG. 19. Processing steps the same as the processing steps in the anomaly detection ECU 100 illustrated in the first embodiment (see FIG. 9) are denoted with the same numerals, and description will be omitted as appropriate.

The anomaly detection ECU 2100 references the correlation information held by the anomaly detection processing timing holding unit 144 using the anomaly detection processing requesting unit 142, and decides the anomaly detection processing timing corresponding to the acquired ID of the data frame (step S1102). When the decided anomaly detection processing timing has arrived (step S1103), the anomaly detection ECU 2100 inputs an interruption request signal (anomaly detection processing request signal) to the processor of the microcontroller unit 2150 from the anomaly detection processing requesting unit 142 of the controller unit 2140, thereby executing anomaly detection processing based on anomaly detection rules using the anomaly detection processing unit 2154 (step S1106).

The anomaly detection ECU 2100 distinguishes whether or not an anomaly has been detected as the result of anomaly detection processing (step S2107), and in a case where an anomaly has been detected, updates the anomaly state information held by the anomaly state holding unit 2157 (step S2108). That is to say, in a case where an anomaly has been detected, the number of times of detection of an anomaly of a relevant ID in the anomaly state information is incremented by 1. In a case of distinguishing in step S2107 that no anomaly was detected, the anomaly detection ECU 2100 transmission the processing to step S1105.

After updating the anomaly state information in step S2108, the anomaly detection ECU 2100 distinguishes whether or not the data frame is being received (step S2109), and transmits an error frame to the bus 300 (step S2110) only in a case where the data frame is being received.

2.11 Processing by Monitoring Level Deciding Unit 2156 of Anomaly Detection ECU 2100

Figure 20:
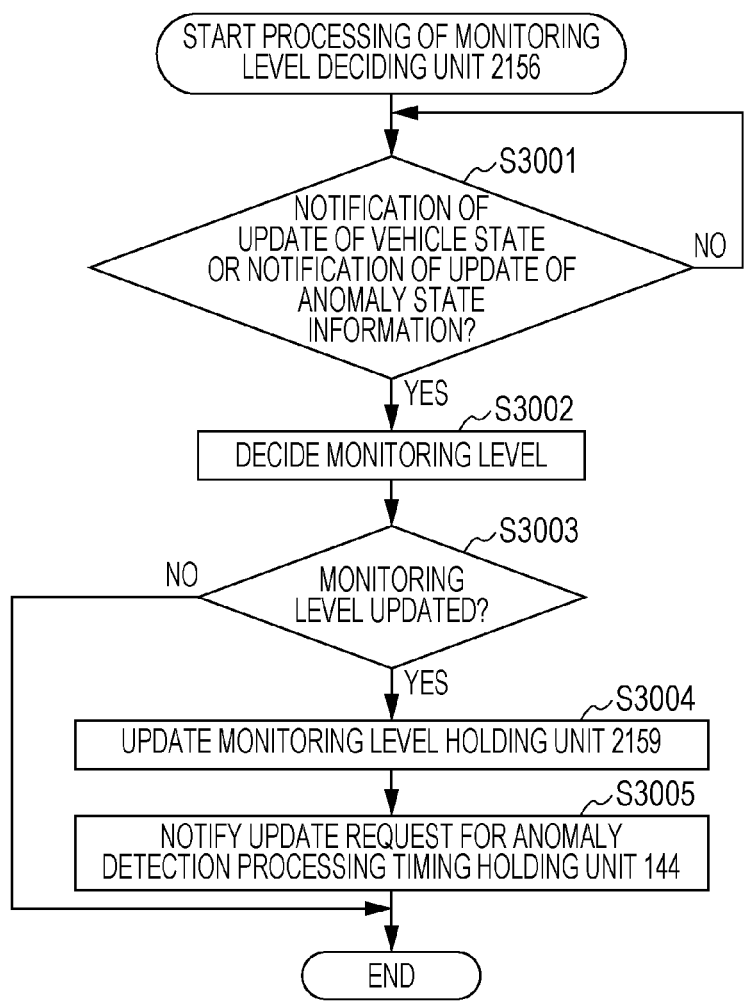
FIG. 20 is a flowchart illustrating processing performed by a monitoring level deciding unit of the anomaly detection ECU according to the second embodiment.

FIG. 20 is a flowchart illustrating processing relating to decision of monitoring level by the monitoring level deciding unit 2156. The monitoring level deciding unit 2156 judges whether or not updating of the anomaly state information has been notified from the anomaly detection processing unit 2154 or updating of the vehicle state information has been notified from the frame processing unit 2152, awaits for notification, and repeats this judging (step S3001).

In a case where notification has been made of updating of the anomaly state information or the vehicle state information, the monitoring level deciding unit 2156 decides the monitoring level for each data frame ID, based on the anomaly state information and vehicle state information (step S3002).

Next, the monitoring level deciding unit 2156 confirms whether the decided monitoring level has changed (been updated) from the previous monitoring level by referencing the monitoring level holding unit 2159 (step S3003). That is to say, the monitoring level deciding unit 2156 compares the decided monitoring level with the previous monitoring level that the monitoring level information (see FIG. 16) held by the monitoring level holding unit 2159 indicates, and if these do not match, the monitoring level deciding unit 2156 determines that there has been a change from the previous monitoring level. If these match in this comparison, the monitoring level has not changed, so the monitoring level deciding unit 2156 ends the processing without updating the monitoring level information.

In a case of determining in step S3003 that the decided monitoring level has changed from the previous monitoring level, the monitoring level deciding unit 2156 updates the monitoring level information held by the monitoring level holding unit 2159 so as to indicate the decided monitoring level for each ID (step S3004).

After having updated the monitoring level information in step S3004, the monitoring level deciding unit 2156 notifies an updating request via the controller communication unit 151 (step S3005). By notifying this update request, the monitoring level deciding unit 2156 rewrites the anomaly detection processing timing in the correlation information that the anomaly detection processing timing holding unit 144 of the controller unit 2140 holds, based on the anomaly detection processing timing identifying information (see FIG. 12) in accordance with the monitoring level.

2.12 Advantages of Second Embodiment

In the onboard network system 11 according to the second embodiment, the anomaly detection ECU 2100 decides an anomaly detection processing timing in accordance with the ID of a received data frame, based on correlation information held in the anomaly detection processing timing holding unit 144, and performs anomaly detection processing at the decided anomaly detection processing timing. Anomaly detection processing is performed at suitable timings in accordance with the IDs of the data frames, so efficient detection of unauthorized frames can be realized. Further, the onboard network system 11 can change the anomaly detection processing timing in accordance with the state of the vehicle in which the onboard network system 11 is installed, and results of anomaly detection processing, more specifically in accordance with the monitoring level decided from the state of the vehicle and the state of anomaly. Accordingly, anomaly detection processing can be performed at appropriate timings according to the state of the vehicle and the state of anomaly, and electric power consumption can be reduced.

Other Embodiments

The first and second embodiments have been described above as examples of the art relating to the present disclosure. However, the art relating to the present disclosure is not restricted to this, and also is applicable to embodiments where modifications, substitutions, additions, omissions, and so forth have been performed as appropriate. For example, the following modifications are also included in an embodiment of the present disclosure.

(1) The anomaly detection processing requesting unit 142 has been described above as deciding the anomaly detection processing timing based on the correlation information, but the contents, format, and so forth of the correlation information can be optionally changed, and the anomaly detection processing timing may be determined individually for each ID.

(2) The data frame in the CAN protocol has been described in the above embodiments in a standard ID format, but this may be an extended ID format. In a case of an extended ID format, the ID of the data frame is represented by a total of 29 bits of the base ID at the ID position in the standard ID format, and the extended ID.

(3) The anomaly detection processing timing has been described in the above embodiments as being one of when receiving an ID, when receiving a DLC, when receiving data, and at the time of completion of region of the data frame, but anomaly detection processing may be performed at timings other than these. For example, in a case where the anomaly detection rules (see FIG. 6) stipulate a value a predetermined number of bytes from the beginning of the data field (e.g., the highest-order one byte, etc.) as the rules for data regarding each ID, the anomaly detection processing timing may be the time at which the predetermined number of bytes (e.g., 1 byte) from the beginning of the data field was received, and not when receiving data, (i.e., not when the data field of the size indicated by the DLC has been received).

(4) Although description has been made in the above embodiments that in a case where an anomaly is detected regarding a data frame while the anomaly detection ECU 100 or 2100 is receiving the data frame, an error frame is transmitted, an error frame does not necessarily have to be transmitted. The ECUs can be prevented from executing an unauthorized data frame by a method other than transmitting an error frame (e.g., by notifying other ECUs over a communication path other than the bus 300, et.). Alternatively, the other ECUs may be notified that an anomaly has been detected by the data frame, without notifying an error frame, and long information may be recorded, information transmitted to an external server, or the like, as described above.

(5) In a case of the above-described anomaly detection processing unit 154 or 2154 performing multiple inspections on a single data frame as anomaly detection processing, and in a case where the frame has been determined as being an unauthorized frame in one inspection thereof (an anomaly has been detected), the remaining inspections may be omitted.

(6) Description has been made in the above embodiments that the states of the vehicle which the vehicle state information indicates is the four states of stopped, charging, driving, and driving at high speed, for example, but other states may be indicated. Various types of states that can be identified by sensors, devices, or the like installed in the vehicle may be used as states of the vehicle in the vehicle state information. For example, the state of the ignition key inserted into the ignition key cylinder, the state of the gear position (e.g., in park, neutral, first speed, second speed, and so forth), the network load state of the bus 300 or the like, and so forth may be used as states of the vehicle in the vehicle state information. Note that for the state of the network load, the state of the bus load to which ECUs of a particular function classification are connected may be focused on, in accordance with the function classification of ECUs connected to each of the busses making up the onboard network system 11, as a state of the vehicle in the vehicle state information. Examples of function classifications of ECUs include the "drive-related" which are functions relating to the vehicle driving, such as the engine, motor, fuel, battery, transmission, and so forth, "body-related" which are functions related to control of the accessories such as door locks, the air conditioner, lights, turn indicators, and so forth. Besides the anomaly detection processing timing being decided in the correlation information for each ID, the anomaly detection processing timing may be decided for each ID group made up of multiple IDs (e.g., a group sectioned by function classification of ECUs transmitting data frames of those IDs).

(7) Although the anomaly detection ECU 2100 has been described in the above embodiments are acquiring data frames indicating the state of the vehicle from other ECUs via the bus, the state of the vehicle may be acquired some other way. For example, the state of the vehicle may be acquired by a dedicated communication path for notifying the state of the vehicle (e.g., a dedicated signal line or the like).

(8) Although description has been made in the above embodiments that the number of times an anomaly is detected by the anomaly detection processing (anomaly occurrence count) is an example of a state of anomaly to serve as the basis for the monitoring level for data frames of each ID, other than the anomaly occurrence count may be used as a state of anomaly. For example, a reliability of the ID, calculated based on the results of anomaly detection processing, or the like, may be used.

(9) Although description has been made in the above embodiments that the monitoring level is decided in accordance with the state of vehicle and state of anomaly, an arrangement may be made where the monitoring level is decided according to, of these two, just the state of the vehicle. Alternatively, the monitoring level may be decided according to just the state of anomaly. Also, a table (see FIGS. 13A through 13D) does not necessarily have to be used to decide the monitoring level, and this may be decided by computation (a function or the like) taking the state of the vehicle and the state of anomaly as input.

(10) Although description has been made in the above embodiments that the anomaly detection processing is performed by the microcontroller unit 150 or 2150, the anomaly detection processing may be performed at the controller unit 140 or 2140. Also, although description has been made in the above embodiments that the microcontroller unit 2150 decides the monitoring level, but the monitoring level may be decided by the controller unit 2140. Further, although description has been made in the above embodiments that the microcontroller unit 2150 has the anomaly state holding unit 2157 and vehicle state holding unit 2158, the controller unit 140 or 2140 may have both or one of these.

(11) Although description has been made in the above embodiments that the anomaly state holding unit 2157 holds the final updated time, and judgment to reset the anomaly occurrence count is performed by the difference thereof as to the current time, the resetting may be performed some other way. For example, a timer may be set at the time of the final update, and resetting be performed by the timer. Also, an arrangement may be made where the anomaly occurrence count is not reset, or where the anomaly state holding unit 2157 does not record the final update time.

(12) Although description has been made in the above embodiments that the anomaly detection processing requesting unit 142 notifies the anomaly detection processing unit 154 or 2154 of an anomaly detection processing request signal (specifically, inputs to the processor of the microcontroller unit 150 or 2150) as an interruption request signal, notification of the anomaly detection processing request signal may be performed by another method (e.g., a method of periodically querying the anomaly detection processing unit 154 or 2154 for an anomaly detection processing request signal, or the like).

(13) Although description has been made in the above embodiments that the anomaly detection processing unit 154 or 2154 acquire information necessary for anomaly detection processing via the controller communication unit 151, communication may be directly made with the controller unit 140 or 2140, so as to acquire information necessary for processing. This acquisition may be realized by providing a separate communication path (dedicated signal line or the like) from the communication path, for the controller communication unit 151 to exchange signals with the controller unit 140 or 2140, for example.

(14) The anomaly detection processing unit 2154 has been described in the above embodiments as notifying the monitoring level deciding unit 2156 of having updated the content (anomaly state information) of the anomaly state holding unit 2157, but this notification of updating does not have to be performed. Similarly, the frame processing unit 2152 does not have to notify of updating of the vehicle state. Although the monitoring level deciding unit 2156 has been described in the above embodiments as deciding the monitoring level at the time of having been notified of updating of the state of the vehicle or the state of anomaly, deciding of the monitoring level is not restricted to this time. For example, the monitoring level deciding unit 2156 may periodically decide the monitoring level.

(15) Although the monitoring level deciding unit 2156 has been described in the above embodiments as updating the content (correlation information) of the anomaly detection processing timing holding unit 144 via the controller communication unit 151, the correlation information may be updated by direct communication with the controller unit 140 or 2140. This updating may be realized by providing a separate communication path (dedicated signal line or the like) from the communication path, for the controller communication unit 151 to exchange signals with the controller unit 2140, for example.

(16) Although the anomaly detection ECU and other ECUs in the above embodiments have been described as having digital circuits such as a processor, memory, and so forth, analog circuits, communication circuits, and so forth, the ECUs may include other hardware component such as a hard disk, display, keyboard, mouse, and so forth. The functions thereof may be realized by dedicated hardware (digital circuits and so forth) instead of realizing the functions by software by a control program stored in memory being executed by the processor.

(17) Part or all of the components of which the above-described devices are configured may be configured as one system Large Scale Integration (LSI). A system LSI is a super-multifunctional LSI fabricated with multiple components integrated on a single chip, and specifically is a computer system configured including a microprocessor, ROM, RAM, and so forth. The RAM stores the computer program. The system LSI achieves its functions by the microprocessor operating according to the computer program. The components of which the above-described devices are configured may each be independently formed as a single chip, or part or all may be included in a single chip. While a system LSI has been mentioned, there are different names according to the degree of integration, such as IC, LSI, super LSI, and ultra LSI. The way in which the integrated circuit is formed is not restricted to LSIs, and may be realized by dedicated circuits or general-purpose processors. A Field Programmable Gate Array (FPGA) capable of being programmed after manufacturing the LSI, or a reconfigurable processor of which the connections and settings of circuit cells within the LSI can be reconfigured, may be used. Moreover, in the event of the advent of an integrated circuit technology which would replace LSIs by advance of semiconductor technology or a separate technology derived therefrom, such a technology may be used for integration of the functional blocks, as a matter of course. Application of biotechnology is a possibility.

(18) Part or all of the components of which the above-described devices are configured may be configured as an IC card detachably mountable to each device, or a standalone module. The IC card or standalone module is a computer system configured including a microprocessor, ROM, RAM, and so forth. The IC card or standalone module may include the above-described super-multifunctional LSI. The IC card or standalone module achieves its functions by the microprocessor operating according to the computer program. The IC card or standalone module may be tamper-resistant.

(19) The present disclosure may in one form be the anomaly detection method illustrated in FIGS. 8 and 9, and so forth, for example, may be a computer program which realizes these methods by a computer, or may be digital signals made up of the computer program. The present disclosure may be the computer program or the digital signals recorded in a computer-readable recording medium, such as for example, a flexible disk, hard disk, CD-ROM, MO, DVD, DVD-ROM, DVD-RAM, BD (Blu-ray (a registered trademark) Disc), semiconductor memory, or the like. The present disclosure may also be the digital signals recorded in these recording mediums. The present disclosure may be an arrangement where the computer program or the digital signals are transmitted over an electric communication line, wireless or cable communication line, a network of which the Internet is representative, data broadcasting, or the like. The present disclosure may be a computer system having a microprocessor and memory, where the memory stores the computer program, and the microprocessor operates according to the computer program. This may also be carried out by another independent computer system, by the program or digital signals being recorded in the recording medium and being transported, or by the program or digital signals being transferred over the network or the like.

(20) The forms realized by optionally combining the components and functions exemplified in the above-described embodiments and the above-described modifications are also included in the scope of the present disclosure.

This present disclosure is applicable to use for efficient detection of transmission of unauthorized frames over a bus in an onboard network system according to CAN.

What is claimed is:

1. An anomaly detection electronic control unit that detects an unauthorized data frame and that is connected to a bus which a plurality of electronic control units use for communication to communicate following a Controller Area Network (CAN) protocol, the anomaly detection electronic control unit comprising:
an anomaly detection processing requester that decides an anomaly detection processing timing based on an ID of a data frame while the data frame is being acquired from the bus,
wherein the data frame includes multiple fields,
wherein a field in the multiple fields stores the ID of the data frame,
wherein the field, storing the ID of the data frame, is acquired from the bus, and
wherein the anomaly detection processing timing is a reception timing of at least one of the multiple fields in the data frame; and
an anomaly detection processor that performs anomaly detection processing regarding the data frame at the anomaly detection processing timing decided by the anomaly detection processing requester.

2. The anomaly detection electronic control unit according to claim 1, further comprising:
a microcontroller that is a semiconductor integrated circuit including a microprocessor that executes a program; and
a controller that is a semiconductor integrated circuit that is connected to the microcontroller and that realizes functions of the anomaly detection processing requester,
wherein the microprocessor realizes the functions of the anomaly detection processor by performing the anomaly detection processing in correlation with an interruption request signal by executing the program, and
wherein the anomaly detection processing requester sends out the interruption request signal to the microprocessor at the decided anomaly detection processing timing.

3. The anomaly detection electronic control unit according to claim 1, further comprising:
an anomaly detection processing timing holder that holds correlation information, in which a timing is correlated with each of one or more IDs,
wherein the anomaly detection processing requester makes the decision, with a timing correlated with the ID of the data frame acquired from the bus in the correlation information, as the anomaly detection processing timing.

4. The anomaly detection electronic control unit according to claim 3,
wherein the correlation information has the reception timing of one or a plurality of particular fields in a data frame correlated with the timing, for each of the one of more IDs, and
wherein the anomaly detection electronic control unit sends an error frame to the bus in a case that the anomaly detection processor detects an anomaly in the anomaly detection processing performed at a receipt timing of the particular field.

5. The anomaly detection electronic control unit according to claim 4,
wherein one of the one or the plurality of particular fields is one of an identifier (ID) field, a data length code (DLC) field, and a data field.

6. The anomaly detection electronic control unit according to claim 4, further comprising:
an anomaly state holder that holds anomaly state information, which is updated so as to indicate, regarding each of the plurality of IDs according to the correlation information, a number of times of detection of anomalies in the anomaly detection processing already performed regarding data frames having that ID,
wherein, with regard to each of the plurality of IDs, the greater the number of times of detection of anomalies regarding that ID is in the anomaly state information, the more reception timings of the particular fields the anomaly detection processing timing holder correlates that ID with in the correlation information.

7. The anomaly detection electronic control unit according to claim 1,
wherein the anomaly detection processing requester performs the deciding of the anomaly detection processing timing in accordance with the detection results of anomalies in the anomaly detection processing that has already been performed.

8. The anomaly detection electronic control unit according to claim 1,
wherein the anomaly detection processing requester performs the deciding of the anomaly detection processing timing in accordance with a state of a vehicle in which the bus is installed.

9. The anomaly detection electronic control unit according to claim 1,
wherein, if the ID of the data frame is a first value, the anomaly detection processing requester performs the deciding such that the anomaly detection processing timing is a timing when receiving the data frame, and if the ID of the data frame is a second value that is different from the first value, performs the deciding such that the anomaly detection processing timing is a timing after completion of receiving the data frame, and
wherein, in a case of having detected an anomaly in the anomaly detection processing performed by the anomaly detection processor at the timing of receiving the data frame, the anomaly detection electronic control unit sends out an error frame onto the bus.

10. The anomaly detection electronic control unit according to claim 2, further comprising:
memory that stores the program.

11. The anomaly detection electronic control unit according to claim 2, further comprising:
a hard disk device that stores the program.

12. An onboard network system including a plurality of electronic control units that detect unauthorized data frames and that communicate via a bus following a Controller Area Network (CAN) protocol, the onboard network system comprising:
an anomaly detection processing requester that decides an anomaly detection processing timing based on an ID of a data frame while the data frame is being acquired from the bus,
wherein the data frame includes multiple fields, wherein a field in the multiple fields stores the ID of the data frame, wherein the field, storing the ID of the data frame, is acquired from the bus, and wherein the anomaly detection processing timing is a reception timing of at least one of the multiple fields in the data frame; and an anomaly detection processor that performs anomaly detection processing regarding the data frame at the anomaly detection processing timing decided by the anomaly detection processing requester.

13. An anomaly detection method used in an onboard network system including a plurality of electronic control units that detect unauthorized data frames and that communicate via a bus following a Controller Area Network (CAN) protocol, the method comprising:

deciding an anomaly detection processing timing based on an ID of a data frame while the data frame is being acquired from the bus, wherein the data frame includes multiple fields, wherein a field in the multiple fields stores the ID of the data frame, wherein the field, storing the ID of the data frame, is acquired from the bus, and wherein the anomaly detection processing timing is a reception timing of at least one of the multiple fields in the data frame; and performing anomaly detection processing regarding the data frame at the decided anomaly detection processing timing.

* * * * *